United States Patent [19]
Seraji

[11] Patent Number: 5,294,873
[45] Date of Patent: Mar. 15, 1994

[54] KINEMATIC FUNCTIONS FOR REDUNDANCY RESOLUTION USING CONFIGURATION CONTROL

[75] Inventor: Homayoun Seraji, La Crescenta, Calif.

[73] Assignee: The United States of America as represented by the Administrator of the National Aeronautics and Space Administration, Washington, D.C.

[21] Appl. No.: 967,083

[22] Filed: Oct. 27, 1992

[51] Int. Cl.$^5$ ............................................. G05B 19/42
[52] U.S. Cl. ................................. 318/568.1; 318/561; 318/646; 318/628; 395/95; 901/9
[58] Field of Search ..................... 318/560–640, 318/646; 395/80–89; 901/3, 5, 7, 9, 15, 13, 14, 17, 18–24

[56] References Cited

U.S. PATENT DOCUMENTS

| | | |
|---|---|---|
| 4,547,858 | 10/1985 | Horak . |
| 4,594,671 | 6/1986 | Sugimoto et al. . |
| 4,621,332 | 11/1986 | Sugimoto et al. . |
| 4,625,285 | 11/1986 | Mori et al. . |
| 4,680,519 | 7/1987 | Chand et al. . |
| 4,975,856 | 12/1990 | Vold et al. . |
| 4,999,553 | 3/1991 | Seraji ..................... 318/561 |
| 5,023,808 | 6/1991 | Seraji ..................... 901/9 X |
| 5,049,796 | 9/1991 | Seraji ..................... 318/568.1 |
| 5,086,400 | 2/1992 | Hayati et al. ............. 395/95 |

*Primary Examiner*—Paul Ip
*Attorney, Agent, or Firm*—John H. Kusmiss; Thomas H. Jones; Guy M. Miller

[57] ABSTRACT

The invention fulfills new goals for redundancy resolution based on manipulator dynamics and end-effector characteristics. These goals are accomplished by employing the recently developed configuration control approach. Redundancy resolution is achieved by controlling the joint inertia matrix or the end-effector mass matrix that affect the inertial torques, or by reducing the joint torques due to gravity loading and payload. The manipulator mechanical-advantage and velocity-ratio are also used as performance measures to be improved by proper utilization of redundancy. Furthermore, end-effector compliance, sensitivity, and impulsive force at impact are introduced as redundancy resolution criteria. The new goals for redundancy resolution allow a more efficient utilization of the redundant joints based on the desired task requirements.

15 Claims, 11 Drawing Sheets

KINEMATIC FUNCTIONS FOR REDUNDANCY RESOLUTION USING CONFIGURATION CONTROL

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to robotic control methods using configuration control techniques disclosed in U.S. Pat. No. 4,999,553.

2. Background Art

1. Introduction

Redundant robot manipulators possess more joint degrees-of- freedom than are required for the basic task of controlling the end-effector motion. The "extra" joints can provide high dexterity and versatility by enabling the robot to accomplish additional tasks. This is based on the observation that for a given end-effector location, the manipulator can assume infinite distinct configurations, each with a different measure of task performance, such as manipulability index. This provides a basis for utilization of redundancy to improve the task performance measure by formulating this requirement as an additional task. However, since the robot performs a variety of diverse tasks, the motivation for utilizing the redundancy in each task can be widely different. For instance, in a free-space motion task, the redundancy can be used to reduce the inertial torques or increase the efficiency of end-effector motion; whereas in a constrained contact task, improvement of mechanical-advantage or reduction of impulsive impact force are appropriate goals. Therefore, the resolution of redundancy must be based on the particular task to be performed.

In the description that follows, reference is made to individual publications listed numerically at the end of this specification by number (e.g., such as "[1]").

While redundancy is a desirable feature in a robot manipulator, the presence of redundant joints complicates the manipulator control problem considerably. The control of redundant robots has been the subject of considerable research during the past two decades. Despite this long history, previous investigations are often focused on the Jacobian pseudoinverse approach proposed originally by Whitney [1] in 1969 and improved subsequently by Liégois [2] in 1977. This approach resolves the redundancy at the velocity level by optimizing an objective function, and produces non-cyclic motions. For instance, using the Jacobian pseudoinverse approach, Suh and Hollerbach [3] suggest methods for minimization of instantaneous joint torques. Khatib [4] proposes a scheme to reduce joint torques by using the inertia-weighted Jacobian pseudoinverse. Dubey and Luh [5] and Chiu [6] use the pseudoinverse approach to optimize the manipulator mechanical-advantage and velocity-ratio using the force and velocity manipulability ellipsoids. Walker [7] resolves the redundancy by reducing the impulsive force at impact using the Jacobian pseudoinverse approach. Maciejewski and Klein [8] describe a method for obstacle avoidance based on pseudoinverse control.

In recent specifications [9–16], a new approach called configuration control is proposed for resolution of redundancy and control of redundant manipulators. This approach is based on task augmentation and resolves the redundancy at the position (i.e., task) level, thereby yielding cyclic motions. In this approach, the basic task of end-effector motion is augmented by a user-defined additional task for redundancy resolution. In previous specifications, the additional task is chosen as posture or self-motion control [15,16], optimal joint movement [14,16], or collision avoidance [13,16]. This specification introduces further options for additional task based on manipulator dynamics and end-effector characteristics.

The structure of the specification is as follows. Section 2 describes new additional task options for redundancy resolution within the configuration control framework. A simple planar three-link manipulator is used in the computer simulation studies of Section 3 to illustrate some of the concepts introduced in the specification. Section 4 discusses the results of the specification and draws some conclusions.

SUMMARY OF THE INVENTION

2. Task Options for Redundancy Resolution

In this section, we present a number of task options that can be accomplished through redundancy resolution, in addition to the basic task of end-effector motion. This provides a suite of additional tasks from which the appropriate task can be selected by the user based on the particular application at hand. The user can also attempt to achieve multiple additional tasks simultaneously using the method described in [14].

Consider a kinematically redundant robot manipulator having n joints with its end-effector operating in an m-dimensional task-space, where $m < n$. The forward kinematic model which relates the $m \times 1$ end-effector coordinate vector Y to the $n \times 1$ joint angular position vector $\theta$ is given by $$Y = f(\theta) \qquad (1)$$

and the differential kinematic model is represented by $$\dot{Y} = J_e(\theta)\dot{\theta} \qquad (2)$$

where the $m \times 1$ vector f denotes the nonlinear forward kinematic functions, and $$J_e = \frac{\partial f}{\partial \theta}$$

is the $m \times n$ end-effector Jacobian matrix. For free-space (i.e., unconstrained) motion, the dynamic model of the manipulator relating the $n \times 1$ joint torque vector to the joint angles $\theta$ can be described by $$\mathcal{T} = M(\theta)\ddot{\theta} + N(\theta,\dot{\theta}) + G(\theta) \qquad (3)$$

where $M(\theta)$ is the $n \times n$ joint inertia matrix, $N(\dot{\theta},\theta)$ is the $n \times 1$ vector of Coriolis, centrifugal and frictional torques, and $G(\theta)$ is the $n \times 1$ vector of gravitational torque. It is seen that the total joint torque $\mathcal{T}$ is composed of three components. The first and second components in (3) are the acceleration-dependent and velocity- dependent torques $M(\theta)\ddot{\theta}$ and $N(\theta,\dot{\theta})$. However, the coefficients through which $\ddot{\theta}$ and $\dot{\theta}$ generate joint torques are functions of the joint angles $\theta$. On the other hand, the third component in (3), namely the gravity torque $G(\theta)$, depends only on the manipulator configuration $\theta$.

In the configuration control approach [9-11], the user defines a set of r ($=n-m$) kinematic functions $\Phi = h(\theta)$ to be controlled during the basic task of specified end-effector motion $Y = Y_d(t)$. The kinematic model (1) is then augmented to include $\Phi$ as $$X = \begin{pmatrix} Y \\ \Phi \end{pmatrix} = \begin{pmatrix} f(\theta) \\ h(\theta) \end{pmatrix} \quad (4)$$

where X is the $n \times 1$ configuration vector. The user can then set up an additional task for redundancy resolution by imposing the constraint $\Phi(\theta) = \Phi_d(t)$, where $\Phi_d(t)$ is the user-specified desired time variation of $\Phi$. Once $\Phi$ and $\Phi_d$ are defined, the manipulator control problem is to ensure that the configuration vector X tracks the desired trajectory $$X_d(t) = \begin{pmatrix} Y_d(t) \\ \Phi_d(t) \end{pmatrix}$$

using either a kinematic or a dynamic control law [9,14]. This formulation puts the redundancy resolution constraint on the same footing as the end-effector task, and treats both Y and $\Phi$ equally in a common format.

Because of the user's freedom in the selection of the kinematic functions $\Phi$, the configuration control approach provides a general methodology for task-based resolution of redundancy. In this section, we present various alternatives for redundancy resolution through the definition of the kinematic functions $\Phi$ within the configuration control framework.

DETAILED DESCRIPTION OF THE INVENTION

Figure 1:
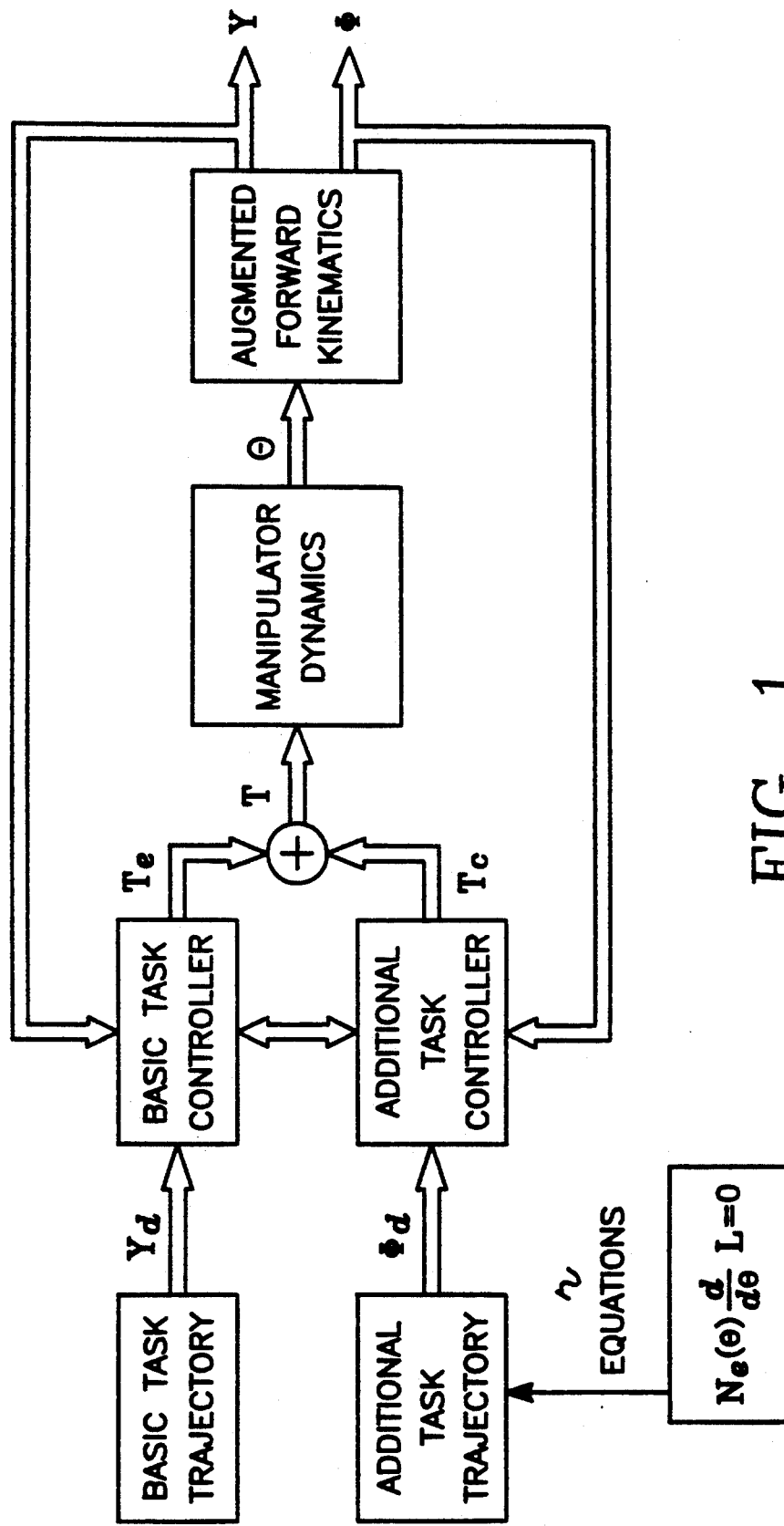
FIG. 1 is a block diagram of a robot control system embodying the present invention.

Referring to FIG. 1, the configuration control method described in U.S. Pat. No. 4,999,553 (the disclosure of which is hereby incorporated herein by reference in its entirety) finds the required joint motions such that the configuration vector $X(\theta)$ tracks the desired trajectory $X_d(t)$. This formulation puts the redundancy resolution constraint on the same footing as the end effector task motion and treats both Y and $\Phi$ equally in a common format. As illustrated in FIG. 1, a basic (desired) task trajectory $Y_d$ is defined as a function of time to a basic task controller while an additional task trajectory is defined as a function of time to an additional task controller. The basic task controller and the additional task controller produce torque commands $T_e$ and $T_c$ respectively which are summed at a summing node and input to manipulator dynamics. The manipulator dynamics produces a new vector $\Theta$ of joint angles from which augmented forward dynamics compute the latest values of Y and $\Phi$ which are fed back to the controllers and compared with the current desired values of $Y_d$ and $\Phi_d$ in a feed-back control architecture. As indicated in FIG. 1, the additional task trajectory is specified by r kinematic functions defining a minimization of an objective function over r joints which the user may select from among the n joints of the robot. It is a discovery of the invention that the objective function may specify gravity loading, joint inertia, mechanical advantage, velocity ratio, end effector sensitivity, end effector compliance or end effector impact force, so that these quantities may be controlled or optimized (minimized) using the self-motion available to a redundant robot performing a required task motion of its end effector.

2.1 Gravitational Torques

In this case, the redundancy is utilized to minimize the effect of gravity loading on the joints or to reduce the gravity torque due to a payload during a specified end-effector motion. This yields the optimal configuration for which the payload capacity of the manipulator is maximized. It also enables the user to optimally preconfigure the redundant manipulator before picking up the payload.

The joint torque due to gravity loading is represented by $G(\theta)$ in (3), and is configuration-dependent. Let us define the scalar weighted gravity loading objective function as $$L_g = G^T(\theta) W G(\theta) = \sum_{i=1}^{n} w_i G_i^2(\theta) \quad (5)$$

where the $n \times n$ constant matrix $W = \text{diag}_i\{w_i\}$ represents the weighting factors assigned by the user to the joints. In order to optimize $L_g$ subject to the end-effector constraint $Y = f(\theta)$, from Appendix 5.1 we require $$N_e(\theta) \frac{\partial L_g}{\partial \theta} = 0 \quad (6)$$

where $N_e$ is the $r \times n$ matrix whose rows span the null-space of the end-effector Jacobian $J_e$, that is, $N_e J_e^T = 0$. The optimality condition (6) can be treated as a set of kinematic constraints by defining the r kinematic functions $$\Phi = h(\theta) = N_e(\theta) \frac{\partial L_g}{\partial \theta}$$

and their desired trajectory as $\Phi_d(t) \equiv 0$. Therefore, the optimal joint torque requirement can be stated as $\Phi(\theta) = \Phi_d(t)$, and the configuration control approach can be adopted to ensure that the optimality condition (6) is satisfied while the end-effector is tracking the desired trajectory $Y_d(t)$. Note that the manipulator must be initially at an optimal configuration which satisfies condition (6). This scheme for redundancy resolution is illustrated by a numerical example in Section 3.

The redundancy can alternatively be used to reduce the gravity torque due to a payload. The torques exerted at the manipulator joints due to a payload carried by the end-effector are functions of the manipulator configuration. In general, the payload contributes both dynamic and static terms to the manipulator dynamic model. In this case, we are concerned solely with the static torque due to gravity. In particular, for a given payload and end-effector position and orientation, the redundancy is resolved to yield the optimal joint configuration where the payload gravity torque is at a minimum.

Suppose that the end-effector is holding a payload represented by a point mass p. Then, the static joint torque due to the payload is $$T_p = p J_e^T g \quad (7)$$

where g is the $m \times 1$ vector of gravitational accelerations. The weighted sum-of-squares of joint torques due to the payload is $$L_p = \sum_{i=1}^{n} w_i \tau_{pi}^2 = p^2 \sum_{i=1}^{n} w_i (J_e^T g)_i^2 \quad (8)$$

where $\{w_i\}$ are the joint weighting factors specified by the user. The optimization of $L_p$ subject to the end-effector motion constraint leads to the condition $$N_e(\theta) \frac{\partial L_p}{\partial \theta} = 0 \quad (9)$$

By satisfying (9), we ensure that the manipulator configuration is kept at the minimum payload gravity torque during the end-effector motion.

2.2 Joint Inertia and End-Effector Mass

In this case, the redundancy is utilized to obtain some desirable characteristics for the manipulator inertia matrix in joint space or the mass matrix in Cartesian space. This is motivated by the fact that the inertia and mass matrices depend solely on the manipulator configuration $\theta$, and thus by suitable definition of the kinematic functions, we can influence the inertial torque directly. It is important to note that often the inertial torque is the dominant term in the manipulator dynamic model, particularly during slow motions where the contributions from the velocity-dependent torques are insignificant. As a result, this approach can lead to resolution of redundancy based on torque reduction.

Despite the fact that the joint inertia matrix $M(\theta)$ in the dynamic model (3) is configuration-dependent, the reduction of the "size" of $M(\theta)$ does not necessarily reduce the inertial torque $\mathcal{T}_a = M(\theta)\ddot{\theta}$. This is because the trajectory for the joint acceleration $\ddot{\theta}(t)$ depends on the evolution of the manipulator configuration $\theta(t)$. As a result, a choice of $\theta$ that reduces $M(\theta)$ may yield a large joint acceleration profile $\ddot{\theta}(t)$ and consequently demand a large inertial torque $\mathcal{T}_a$. Nonetheless, it is possible to use the redundancy to affect the norm or some entries of the inertia matrix. For instance, the redundancy can be used to influence certain elements of the joint inertia matrix. Consider a typical joint of the manipulator $\theta_i$ where the joint dynamics can be written as $$\tau_i = M_{ii}(\theta)\ddot{\theta}_i + \sum_{\substack{j=1 \\ j \neq i}}^{n} M_{ij}(\theta)\ddot{\theta}_j + N_i(\theta, \dot{\theta}) + G_i(\theta) \quad (10)$$

It is seen that the inertia $M_{ii}(\theta)$ seen at joint i is a function of all joint angles $\theta$, i.e., the robot configuration. Furthermore, there are inertial couplings between the joints, represented by $\Sigma M_{ij}(\theta)\ddot{\theta}_j$, with the coupling factor $M_{ij}$ dependent on the robot configuration. To simplify the joint control system design, it is sometimes desirable to ensure that the inertia $M_{ii}(\theta)$ is *invariant* with respect to the manipulator configuration $\theta$, that is, $M_{ii}(\theta)$ is a predefined constant. Let the manipulator be at the initial joint configuration $\theta^\circ$ with the corresponding joint i inertia $M_{ii}(\theta^\circ)$. In order to ensure that $$M_{ii}(\theta) = M_{ii}(\theta^\circ) = \text{constant} \quad (11)$$

throughout the end-effector motion, we define the kinematic function as $\phi_i(\theta) = M_{ii}(\theta)$ and its desired trajectory as $\phi_{di}(t) = M_{ii}(\theta^\circ)$. Note that since r kinematic functions can be controlled independently, in general this formulation can be used to make r joint inertias configuration-independent. The configuration control scheme can then be employed to ensure that the joint inertias are held constant and configuration-invariant, while the end-effector is traversing the prescribed path. This approach is illustrated in Section 3.

An alternative approach is to utilize the redundancy to decrease the off-diagonal elements of the joint inertia matrix $M(\theta)$. This is a desirable feature for control purposes since it can reduce the inter-joint couplings and thereby enhance the stability and improve the system performance. In the ideal case, we wish to make the joint inertia matrix diagonal so as to ensure inertial decoupling. To this end, the objective function can be defined as $$L_{mi} = \sum_{\substack{j=1 \\ j \neq i}}^{n} M_{ij}^2(\theta) \quad (12)$$

Following the method of Section 2.1, we can utilize the manipulator redundancy to minimize $L_{mi}$ by satisfying the optimality criterion $$N_e(\theta) \frac{\partial L_{mi}}{\partial \theta} = 0 \quad (13)$$

Using the configuration control approach, the off-diagonal elements in the inertia matrix $M(\theta)$ are reduced optimally, while the end-effector is following the prescribed path. However, note that since the inertial coupling torque $\Sigma_j M_{ij}(\theta)\ddot{\theta}_j$ is also dependent on the joint accelerations $\ddot{\theta}(t)$, this approach does not necessarily lead to a reduction in inter-joint couplings.

The redundancy can also be utilized to affect the end-effector mass matrix. The manipulator dynamic model (3) used so far is in joint-space, as it relates the joint torques $T$ to the joint angles $\theta$. An alternative approach is to use the manipulator dynamic model in the *Cartesian-space* for redundancy resolution. The Cartesian-space dynamic model relating the m×1 applied end-effector force/moment vector $F_y$ to the m×1 end-effector coordinate vector Y can be obtained as [4]

$$F_y = M_y(\theta)\ddot{Y} + N_y(\theta,\dot{\theta}) + G_y(\theta) \quad (14)$$

and the above terms are related to their joint-space counterparts by $$M_y(\theta) = [J_e(\theta)M^{-1}(\theta)J_e^T(\theta)]^{-1}$$

$$N_y(\theta,\dot{\theta}) = M_y(\theta)[J_e(\theta)M^{-1}(\theta)N(\theta,\dot{\theta}) - \dot{J}_e(\theta,\dot{\theta})\dot{\theta}] \quad (15)$$

$$G_y(\theta) = M_y(\theta)J_e(\theta)M^{-1}(\theta)G(\theta)$$

where $M_y(\theta)$ is the m×m end-effector Cartesian mass matrix, and $J_e(\theta)$ is assumed to be of full rank. The end-effector Cartesian force $F_y$ is then mapped into the equivalent joint torque $T_e$ through the Jacobian matrix $J_e$, that is, $T_e = J_e^T(\theta)F_y$. Thus, the dynamic model that relates the joint torque $T_e$ required for end-effector motion to the end-effector Cartesian coordinates Y is given by $$T_e = J_e^T(\theta)M_y(\theta)\ddot{Y} + J_e^T(\theta)N_y(\theta,\dot{\theta}) + J_e^T(\theta)G_y(\theta) \quad (16)$$

It is noted that in the configuration control approach, the total joint torque $T$ is the sum of the two components $T_e = J_e^T F_y$ due to the end-effector motion (basic task) and $T_c = J_c^T F_c$ due to the kinematic constraints (additional task), where $J_c$ and $F_c$ are the Jacobian matrix and control forces related to $\Phi$ [9].

From the robot dynamic model (16), the inertial torque required to cause end-effector motion is given by $T_m = M_e(\theta)\ddot{Y}$, where $M_e(\theta) = J_e^T(\theta)M_y(\theta)$ is an n×m configuration-dependent coefficient matrix. Thus, the coefficient matrix $M_e(\theta)$ can be viewed as the operator that maps the end-effector acceleration $\ddot{Y}$ into the inertial torque $T_m$; that is $M_e(\theta): \ddot{Y} \rightarrow T_m$. By considering the mapping properties of this operator, we can influence directly the inertial torque required for a given end-effector acceleration. One suitable measure of this mapping operator is the spectral norm [17] of the coefficient matrix $M_e(\theta)$ defined as $$\|M_e\|_S = \max_{\ddot{Y} \neq 0} \frac{\|M_e\ddot{Y}\|}{\|\ddot{Y}\|} \quad (17)$$

where the scalar $\|\ddot{Y}\| = [\ddot{Y}^T\ddot{Y}]^{\frac{1}{2}}$ denotes the Euclidean norm of the end-effector acceleration vector $\ddot{Y}$. The spectral norm of $M_e$ defined in (17) is a measure of the largest amount by which any acceleration vector is amplified by the matrix multiplication, i.e., $\|M_e\ddot{Y}\| \leq \|M_e\|_S \cdot \|\ddot{Y}\|$ for all $\ddot{Y}$. In other words, $\|M_e\|_S$ bounds the "amplification factor" of the coefficient matrix $M_e$. Let $M_y^{-1} = J_eM^{-1}J_e^T$ denote the inverse of the end-effector mass matrix, where the dependency on $\theta$ is omitted for simplicity. Note that $M_y^{-1}$ and $M_y$ are m×m symmetric positive-definite matrices with positive eigenvalues $\{\lambda_m, \ldots, \lambda_1\}$ and $\{\lambda_1^{-1}, \ldots, \lambda_m^{-1}\}$, respectively, arranged in increasing order, with $0 < \lambda_m$ $\ldots < \lambda_1$. Then, using the norm inequality [17], from $M_e = J_e^T M_y$, we can write $$\|M_e\|_S \leq \|J_e^T\|_S \cdot \|M_y\|_S \quad (18)$$

or $$\|M_e\|_S \leq \sigma_1 \cdot \lambda_m^{-1} \quad (19)$$

where $\sigma_1 = \|J_e^T\|_S = [\text{Max Eigenvalue}(J_eJ_e^T)]^{\frac{1}{2}}$ (from Appendix 5.2) and $\lambda_m^{-1} = \|M_y\|_S = \text{Max Eigenvalue}(M_y)$. Equation (19) establishes an upper-bound on $\|M_e\|_S$ the $J_e J_e^T$. Hence, using $\|T_m\| \leq \|M_e\|_S \cdot \|\ddot{Y}\|$, we obtain $$\|T_m\| \leq \sigma_1 \cdot \lambda_m^{-1} \cdot \|\ddot{Y}\| \quad (20)$$

Now, $\sigma_1$ and $\lambda_m$ are both functions of the manipulator configuration, i.e., the current values of the joint angles $\theta$. Therefore, we can utilize the redundancy to reduce the inertial torque for a given end-effector acceleration by reducing the configuration-dependent quantity $L_m(\theta) = \sigma_1 \cdot \lambda_m^{-1}$. To this end, $L_m(\theta)$ is defined as the objective function to be minimized through redundancy resolution, and the condition for optimality of $L_m$ subject to the end-effector motion is stated as $$N_e(\theta)\frac{\partial L_m}{\partial \theta} = 0 \quad (21)$$

As in Section 2.1, the configuration control scheme can now be used to ensure that the end-effector follows the desired trajectory while the redundancy is utilized to optimally reduce an upper-bound on the inertial torque norm.

When efficient real-time computational tools for spectral analysis are available, the spectrums of $J_eJ_e^T$ and $M_y$ can be computed and $L_m(\theta) = \sigma_1 \cdot \lambda_m^{-1}$ can be controlled directly. Otherwise, we can compute the "traces" of $J_eJ_e^T$ and $M_y$, and noting that $\sigma_1 < [\text{trace}(J_eJ_e^T)]^{\frac{1}{2}}$ and $\lambda_m^{-1} < \text{trace}(M_y)$, we can replace $\sigma_1$ and $\lambda_m^{-1}$ in the objective function $L_m(\theta)$ by their upper-bounds $[\text{trace}(J_eJ_e^T)]^{\frac{1}{2}}$ and $\text{trace}(M_y)$ to reduce the computations and then proceed with the constrained optimization of $L_m(\theta)$.

It must be noted that in using the end-effector dynamic model (16), the end-effector acceleration $\ddot{Y}$ is *specified* by the basic task, and therefore the inertial torque needed for end-effector motion can be reduced through redundancy utilization as an additional task. This is in contrast to using the joint dynamic model (3) where $\ddot{\theta}$ evoluation is unspecified and therefore inertial torque reduction is not necessarily achieved through reduction of $\|M\|_S$. Finally, it is important to note that the evaluation of the Cartesian terms in (16) is computationally very intensive, and therefore this approach may not be suitable for real-time implementation.

2.3 Mechanical-Advantage

For a redundant manipulator, the joint torques produced when the manipulator makes contact with the environment depend on the manipulator configuration. In some applications, the manipulator configuration requiring lower joint torques for a given contact force is preferred over other configurations. This results in a higher mechanical-advantage and the ability to perform tasks which demand greater end-effector contact forces. In applications requiring fine force control, a low mechanical-advantage is preferable so as to increase the sensitivity of joint torques to end-effector forces.

Suppose that the robot manipulator is interacting with the environment by exerting the m×1 contact force/moment vector F at the end-effector, where some of the elements of F may be zero. The additional joint torque needed to exert the contact force F on the environment is given by $$\mathcal{T}_F = J_e^T(\theta) F \quad (22)$$

The mechanical-advantage $M_a$ of the manipulator is defined as the ratio of the norm of end-effector force to the norm of joint torque [5], that is $$M_a = \|F\| / \|\mathcal{T}_F\| \quad (23)$$

A redundant manipulator allows us to obtain different mechanical advantages for the same end-effector contact force through self-motion. Using (22) and (23), we obtain $$M_a = \frac{\|F\|}{\|J_e^T F\|} = \left[ \frac{F^T F}{F^T J_e J_e^T F} \right]^{\frac{1}{2}} = \left[ \frac{F^T F}{F^T H_m F} \right]^{\frac{1}{2}} \quad (24)$$

where $H_m = J_e J_e^T$ is an m×m symmetric positive semi-definite matrix having m real non-negative eigenvalues $\gamma_1, \ldots, \gamma_m$ with $\gamma_1 \geq \gamma_2 \geq \ldots \geq \gamma_m \geq 0$. It is seen that the mechanical advantage $M_a$ is a function of two variables: the direction of the applied force F and the manipulator configuration $\theta$. We now establish bounds on $M_a$ regardless of F. From matrix theory [17], we have the inequality $$\gamma_m \|F\|^2 \leq F^T H_m F \leq \gamma_1 \|F\|^2 \quad (25)$$

In (25), the equality signs hold when $F = F_1$ or $F = F_m$, where $F_1$ and $F_m$ are eigenvectors of $H_m$ corresponding to the eigenvalues $\gamma_1$ and $\gamma_m$, that is $$F_1^T H_m F_1 = \gamma_1 \|F_1\|^2;$$

$$F_m^T H_m F_m = \gamma_m \|F_m\|^2$$

Now, using (24) and (25) and assuming $\gamma_m \neq 0$, the mechanical advantage of the manipulator is bounded by $$\gamma_1^{-\frac{1}{2}} \leq M_a \leq \gamma_m^{-\frac{1}{2}}$$

Let us denote the m singular values of the end-effector Jacobian matrix $J_e$ by $\sigma_1 \geq \sigma_2 \geq \ldots \sigma_m \geq 0$. In Appendix 5.2, it is shown that the eigenvalues of $H_m$ are squares of the singular values of $J_e$, that is, $\gamma_i = \sigma_i^2$. Thus, the bounds on $M_a$ can be expressed in terms of the singular values of $J_e$ as $$\sigma_1^{-1} \leq M_a \leq \sigma_m^{-1} \quad (26)$$

where $\sigma_1 = [\lambda_{max}(J_e J_e^T)]^{\frac{1}{2}}$ is also equal to the spectral norm of $J_e$, $\sigma_1 = \|J_e\|_S$, and $\sigma_m$ is assumed to be non-zero. In other words, the mechanical advantage lies in a range defined by the largest and smallest singular values of $J_e(\theta)$. When the manipulator is at an end-effector kinematic singularity, $J_e(\theta)$ becomes rank-deficient and $\sigma_m = 0$. In this case, the mechanical advantage grows to infinity, which implies that a finite contact force can be produced by a very small joint torque. Although this is appealing from a force application point of view, the end-effector loses mobility in certain Cartesian directions which is clearly undesirable [6].

Now, since from (26) the bounds on $M_a$ are functions of the manipulator configuration $\theta$, they can be defined as kinematic functions within the configuration control framework and controlled directly during the end-effector motion. Computationally, it is more efficient to evaluate the Frobenius norm [17] of the Jacobian matrix, where $\|\cdot\|_F$ is the square-root of the sum of the matrix elements squared, i.e., $\|J_e\|_F^2 = \Sigma_{j=1}^n \Sigma_{i=1}^m J_e^2(i,j) = \text{trace}[H_m]$. Noting that $\text{tr}[H_m] = \Sigma_{i=1}^m \gamma_i \geq \gamma_1$, we obtain the inequality $$[\|J_e\|_F]^{-1} \leq M_a \quad (27)$$

Inequalities (26) and (27) imply that the joint torque norm cannot exceed the Jacobian norm times the applied force norm, that is, $$\|\mathcal{T}_F\| \leq \|J_e\|_S \|F\| \leq \|J_e\|_F \|F\|$$

Note that the above inequality can also be obtained directly from (22). For applications requiring a high mechanical advantage, we can define the objective function as $L(\theta) = \|J_e(\theta)\|_F^2$ and minimize $L(\theta)$ during the end-effector motion. This optimization must be confined to a reasonable bound to ensure that the manipulator is not at a kinematically singular configuration [6].

When the direction of the applied force is known, an alternative approach to controlling the bounds on the mechanical advantage $M_a$ is to utilize the redundancy to directly control the actual value of $M_a$ for a contact task. For a given joint configuration $\theta$, the mechanical advantage of the manipulator is dependent on the direction of the applied contact force F, and varies in the range given by (26). Therefore, we can utilize the redundancy to minimize the joint torques required to produce a given contact force F on the environment and thus maximize the mechanical advantage. In other words, by internal movement of the links without moving the end-effector, the robot is reconfigured to optimally reduce the required joint torques. The objective function $L_f$ to be optimized in this case can be defined as $$L_f = [J_e^T(\theta)\hat{F}]^T[J_e^T(\theta)\hat{F}] = \hat{F}^T H_m(\theta)\hat{F} \quad (28)$$

where $\hat{F}$ is a known unit vector in the direction of the force F to be applied by the end-effector, i.e. $\hat{F} = F / \|F\|$. For a given end-effector position/force trajectory, the problem is to find the optimal manipulator configuration such that the end-effector force F exerted on the environment is achieved with the minimum joint torque norm $L_f$. The condition for optimality of $L_f$ subject to the end-effector motion can be stated as $$N_e(\theta) \frac{\partial L_f}{\partial \theta} = 0 \quad (29)$$

As in Section 2.1, we can now ensure that the mechanical advantage is maximized during the end-effector motion. This is illustrated by a simulation example in Section 3.

2.4 Velocity Ratio for a redundant manipulator, the joint velocities required to move the end-effector with a specified Cartesian velocity depend on the manipulator configuration. Often, the manipulator configuration requiring lower joint velocities to achieve the same end-effector velocity is preferable over the others.

From (2), the $m \times 1$ end-effector Cartesian velocity vector $\dot{Y}$ is related to the $n \times 1$ joint velocity vector $\dot{\theta}$ through the $m \times n$ end-effector Jacobian matrix $J_e(\theta)$ as $$\dot{Y} = J_e(\theta)\dot{\theta} \tag{30}$$

The velocity ratio $V_r$ of the manipulator is defined as the ratio of the norm of end-effector velocity to the norm of joint velocity [5], that is $$V_r = \frac{\|\dot{Y}\|}{\|\dot{\theta}\|} \tag{31}$$

Depending on the configuration of the redundant manipulator, different velocity ratios can be obtained for the same end-effector Cartesian velocity. From (30) and (31), we obtain $$V_r = \frac{\|J_e \dot{\theta}\|}{\|\dot{\theta}\|} = \left[\frac{\dot{\theta}^T J_e^T J_e \dot{\theta}}{\dot{\theta}^T \dot{\theta}}\right]^{\frac{1}{2}} = \left[\frac{\dot{\theta}^T H_v \dot{\theta}}{\dot{\theta}^T \dot{\theta}}\right]^{\frac{1}{2}} \tag{32}$$

The $n \times n$ matrix $H_v = J_e^T J_e$ is symmetric and positive semi-definite, with n real eigenvalues that are closely related to those of the $m \times m$ matrix $H_m = J_e J_e^T$, namely $[\gamma_1, \ldots, \gamma_m]$. In Appendix 5.2, it is shown that the n eigenvalues of $H_v$ consist of the m eigenvalues of $H_m$ and $(n-m)$ zeros, that is $[\gamma_1, \ldots, \gamma_m, 0, \ldots, 0]$ with $\gamma_1 \geq \ldots \geq \gamma_m \geq 0$. Thus, we can state the inequality $$0 \leq \dot{\theta}^T H_v \dot{\theta} \leq \gamma_1 \|\dot{\theta}\|^2 \tag{33}$$

The equality signs hold when $\dot{\theta}$ is an eigenvector of $H_v$ corresponding to $\gamma_1$ or the zero eigenvalue. Thus, $V_r$ is bounded by $$0 \leq V_r \leq \gamma_1^{\frac{1}{2}}$$

This inequality can be written in terms of the largest singular value of the end-effector Jacobian matrix $J_e$ as $$0 \leq V_r \leq \sigma_1 \tag{34}$$

where $\sigma_1 = \|J_e\|_S$. Noting that $\text{tr}[H_v] = \text{tr}[H_m] = \|J_e\|_F^2$ and $\gamma_1 \leq \text{tr}[H_v]$, we obtain $$0 \leq V_r \leq \|J_e\|_F \tag{35}$$

Therefore, the velocity ratio is bounded by the largest singular value and by the Frobenius norm of the end-effector Jacobian matrix $J_e(\theta)$. Inequalities (34) and (35) imply that the end-effector velocity norm cannot exceed the Jacobian norm times the joint velocity norm, that is, $\|\dot{Y}\| \leq \|J_e\|_S \cdot \|\dot{\theta}\| \leq \|J_e\|_F \|\dot{\theta}\|$. Note that this inequality can also be obtained directly from (30). When $\dot{\theta}$ is chosen to be an eigenvector of $H_v$ corresponding to the zero eigenvalue, that is $H_v \dot{\theta} = 0$, then we have $\|\dot{Y}\|^2 = \|J_e \dot{\theta}\|^2 = \dot{\theta}^T [J_e^T J_e] \dot{\theta} = 0$. In this case, the joint motions do not produce any movement of the end-effector and the velocity ratio becomes zero. This is commonly referred to as "self-motion" in a redundant robot [12].

Based on inequalities (34) and (35), the upper-bounds on the velocity ratio, namely $\sigma_1$ or $\|J_e\|_F$, can be defined as the kinematic function $\Phi$ and minimized during the end-effector motion in order to decrease $V_r$. This is an appropriate goal in applications requiring fine position control, such as guarded motion, where a large sensitivity of joint velocities to end-effector velocity is required. Alternatively, when the direction of $\dot{\theta}$ is known, we can optimize the norm of the normalized end-effector velocity, that is $$L_v = [J_e(\theta)\hat{\theta}]^T[J_e(\theta)\hat{\theta}] = \hat{\theta}^T H_v(\theta)\hat{\theta} \tag{36}$$

where $\hat{\theta} = \dot{\theta}/\|\dot{\theta}\|$ is a known unit vector in the direction of $\dot{\theta}$. Following a procedure similar to Section 2.3, we can maximize the velocity ratio $V_r$ through the objective function $L_v$ so that the joint motions are mapped into the end-effector motion most efficiently. This results in configurations requiring lower joint velocities to achieve the same end-effector velocity, and thus more efficient motion is obtained along the specified task trajectory.

It is important to not that the configurations for which the velocity ratio is high yield low mechanical advantage and vice versa. For instance, a singular configuration in which $J_e$ is rank-deficient yields a high mechanical advantage but a low velocity ratio. Since mechanical advantage and velocity ratio are conflicting measures of performance, in resolving the manipulator redundancy based on either $M_a$ or $V_r$, we must take into consideration that the remaining quantity lies within an acceptable range [6].

2.5 End-Effector Sensitivity

Manipulators usually have positioning errors at the joint angles due to backlash or flexibility of joint gear trains, imperfection of joint servo loops and so on. The joint errors or displacements $\Delta\theta$ are propagated through the manipulator geometry to produce perturbation in the end-effector coordinates $\Delta Y$. Certain components of the end-effector perturbation can play a critical role in the execution of a task. For instance, when the end-effector is exerting a force on a workpiece having stiffness k, then a slight perturbation in the end-effector coordinate y at contact will be magnified considerably by the stiffness k to produce the additional contact force $k\Delta y$. This additional force can be excessive and may cause severe damage to the workpiece under contact. In this section, we discuss the utilization of redundancy to minimize a weighted sum of the end-effector perturbations due to small variations in the joint angles.

From (30), the joint displacement $\Delta\theta$ is mapped through the Jacobian matrix $J_e(\theta)$ to produce the resulting end-effector perturbation $\Delta Y$, that is, $\Delta Y = J_e(\theta)\Delta\theta$. Therefore, the sensitivity of the ith end-effector coordinate $y_i$ to the jth joint angle $\theta_j$ is given by $$S_i^j = \frac{\Delta y_i}{\Delta \theta_j} = [J_e(\theta)]_{i,j},$$

where the subscript i,j refers to the (i,j)th element of the matrix. It is seen that $S_i^j$ is solely a function of the manipulator configuration $\theta$, and can therefore be controlled during the end-effector motion. Alternatively, we can define a scalar function $L_s(\theta)$ to represent a weighted sum-of-squares of end-effector perturbations, that is $$L_s(\theta) = \sum_{i=1}^{m} w_i \Delta y_i^2 = (\Delta Y)^T \cdot W \cdot \Delta Y \tag{37}$$

where $W = \text{diag}_i\{w_i\}$ is an $m \times m$ user-specified weighting matrix. Then, we obtain $$L_s(\theta) = [J_e(\theta)\Delta\theta]^T W [J_e(\theta)\Delta\theta] \qquad (38)$$
$$= (\Delta\theta)^T [J_e^T(\theta) W J_e(\theta)] \Delta\theta$$

From matrix theory [17], the bounds on $L_s(\theta)$ are given by $$\lambda_{min}(J_e^T W J_e) \|\Delta\theta\|^2 \leq L_s(\theta) \leq \lambda_{max}(J_e^T W J_e) \|\Delta\theta\|^2 \qquad (39)$$

where $\lambda_{min}$ and $\lambda_{max}$ refer to the smallest and largest eigenvalues of the matrix. Since $J_e^T W J_e$ is a symmetric positive semi-definite matrix, we have $$\text{trace}(J_e^T W J_e) = \sum_{i=1}^n \lambda_i(J_e^T W J_e) \geq \lambda_{max}(J_e^T W J_e) \qquad (40)$$

Hence, an upper-bound on $L_s(\theta)$ is $$L_s(\theta) \leq \text{trace}(J_e^T W J_e) \|\Delta\theta\|^2 \qquad (41)$$

By defining the objective function as the upper-bound on $L_s(\theta)$, namely $\lambda_{max}(J_e^T W J_e)$ or trace $(J_e^T W J_e)$, and minimizing $L_s(\theta)$ during the end-effector motion, we can minimize the end-effector perturbation due to joint displacement.

When the magnitudes of the joint angle variations $\Delta\theta$ are known, an alternative approach to controlling the upper-bound on $L_s(\theta)$ is to directly minimize the actual value of $L_s(\theta)$ in (38) for a given joint angle variation. The condition for optimality of $L_s(\theta)$ subject to the end-effector motion can be stated as $$N_e(\theta) \frac{\partial L_s}{\partial \theta} = 0 \qquad (42)$$

This method is illustrated by a numerical example in Section 3.

2.6 End-Effector Compliance

The compliance of the manipulator end-effector is an important characteristic in determining the Cartesian positioning accuracy in the presence of disturbance forces and payloads. In this section, we discuss the resolution of manipulator redundancy based on the end-effector compliance.

Suppose that a disturbance torque $\mathcal{T}$ applied at the manipulator joints causes the displacement $\Delta\theta$, where $\Delta\theta$ is dependent on the gains of the joint servo loops. The behavior of each manipulator joint can be modeled by a spring with stiffness coefficient k so that $$\mathcal{T} = K\Delta\theta \qquad (43)$$

where $K = \text{diag}_i\{k_i\}$ is the $n \times n$ constant joint stiffness matrix. Let us now apply the end-effector force F and define the resulting end-effector displacement by $\Delta Y$. Then, F and $\Delta Y$ are related by $$\Delta\theta = K^{-1}\mathcal{T} = K^{-1}J_e^T(\theta)F \qquad (44)$$

therefore $$\Delta Y = J_e(\theta)\Delta\theta = [J_e(\theta)K^{-1}J_e^T(\theta)]F = C(\theta)F \qquad (45)$$

where $C(\theta) = J_e(\theta)K^{-1}J_e^T(\theta)$ is the $m \times m$ symmetric end-effector compliance matrix. Depending on the configuration of the redundant robot, different compliance matrices can be obtained for the same end-effector position and orientation. Therefore, by a judicious choice of the manipulator configuration, we can choose the optimal configuration which yields the smallest end-effector compliance [18].

Now, for a given joint stiffness K, the end-effector compliance $C(\theta)$ is only a function of the manipulator joint angles $\theta$. The Frobenius norm $\|C\|_F$ can be used as a measure of the "size" of the compliance matrix C. Therefore, minimizing the Frobenius norm will tend to minimize the matrix elements, leading to a decrease in the end-effector compliance. As a result, the Frobenius norm of $C(\theta)$ can be defined as the objective function $L_c$, namely $$L_c(\theta) = \|C(\theta)\|_F^2 = \sum_{i=1}^m \sum_{j=1}^m c_{ij}^2(\theta) \qquad (46)$$

The manipulator redundancy can then be utilized to minimize $L_c$ as an additional task, similar to Section 2.1. As the norm of $C(\theta)$ becomes smaller, the stiffness of the manipulator at the end-effector increases: This decreases the overall end-effector deflection when subjected to Cartesian forces. An alternative approach is to control some entries of $C(\theta)$ during the end-effector motion. This will reduce the deflection of the end-effector in certain Cartesian directions under externally applied forces. This approach is illustrated in the Example of Section 3.

2.7 Impact Force

Robot manipulators often come into physical contact with workpieces during task execution. At the instant of contact, the manipulator undergoes an impact with the workpiece for a very short period of time. This impact creates an impulsive force at the end-effector which is propagated through the manipulator structure. If the magnitude of this impulsive force is large, it can have detrimental effects on the manipulator and the workpiece. The impact force is a function of the manipulator configuration at the instant of impact. As a result, for a redundant manipulator, the redundancy can be utilized to reduce the impact force, and thus aid in the robot-workpiece interaction [7].

For derivation of the impact force, it is more convenient to express the manipulator dynamics in Cartesian-space as in (14), that is $$\mathcal{F}_a + \mathcal{F}_c = M_y(\theta)\ddot{Y} + N_y(\theta, \dot{\theta}) + G_y(\theta) \qquad (47)$$

where $\mathcal{F}_a$, $\mathcal{F}_c$ and $\ddot{Y}$ are the Cartesian actuator force, impact force and end-effector acceleration, $M_y = [J_e M^{-1} J_e^T]^{-1}$ is the end-effector mass matrix, and $N_y$ and $G_y$ are defined in (15). Suppose that the manipulator-workpiece initial impact occurs at time t for an infinitesimally short time period $\Delta t$. Then integrating both sides of (47) from t to $t + \Delta t$ gives $$\int_t^{t+\Delta t} \mathcal{F}_a dt + \int_t^{t+\Delta t} \mathcal{F}_c dt = \qquad (48)$$

$$\int_t^{t+\Delta t} M_y(\theta)\ddot{Y} dt + \int_t^{t+\Delta t} N_y(\theta,\dot{\theta}) dt + \int_t^{t+\Delta t} G_y(\theta) dt$$

Since $\mathcal{F}_a$, $\theta$ and $\dot{\theta}$ are finite at all times, the integrals of the finite functions $\mathcal{F}_a$, $N_y$ and $G_y$ from t to t+Δt becomes zero as Δt→0. Thus, (48) reduces to $$\vec{\mathcal{F}}_c = M_y(\theta) \int_t^{t+\Delta t} \ddot{Y} dt = M_y(\theta) \Delta \dot{Y} \qquad (49)$$

where $$\vec{\mathcal{F}}_c = \lim_{\Delta t \to 0} \int_t^{t+\Delta t} \mathcal{F}_c \, dt \qquad (50)$$

is defined as the impulsive force at impact, and $\Delta \dot{Y} = \dot{Y}(t+\Delta t) - \dot{Y}(t)$ is the change in end-effector velocity before and after impact. Note that the impulsive force $\vec{\mathcal{F}}_c$ is the time-integral of an ordinary finite impact force $\mathcal{F}_c$ which is very large but acts only for a very short time Δt. Equation (49) implies that the impact force is equal to the change in momentum before and after impact, which is the generalization of a well-known principle of mechanics for a point mass [19]. Equation (49) can be written as $$\Delta \dot{Y} = M_y^{-1}(\theta) \vec{\mathcal{F}}_c \qquad (51)$$

Suppose that the end-effector impacts a fixed stationary workpiece with zero before and after velocities. Then, from the theory of collisions [19], we have $$[\dot{Y} + \Delta \dot{Y}]^T n = -e \dot{Y}^T n \qquad (52)$$

where n is the unit vector normal to the plane of impact, and e is the constant coefficient of restitution denoting the type of collision taking place and lies in the range $0 \leq e \leq 1$, with $e = 0$ for purely plastic and $e = 1$ for purely elastic collisions. Since the impact force $\vec{\mathcal{F}}_c$ is directed along n, it can be expressed as $\vec{\mathcal{F}}_c = \hat{\mathcal{F}}_c n$, where the scalar $\hat{\mathcal{F}}_c$ denotes the magnitude of $\vec{\mathcal{F}}_c$. From (48) and (49), we obtain $$\hat{\mathcal{F}}_c = \frac{-(1+e) \dot{Y}^T n}{n^T M_y^{-1}(\theta) n} \qquad (53)$$

Equation (53) gives an expression for the magnitude of the impact force $\hat{\mathcal{F}}_c$ in terms of the manipulator configuration $\theta$ at impact and end-effector velocity $\dot{Y}$ before impact. This equation is also obtained in [7] using the joint-space dynamic model (3). Since $M_y^{-1}(\theta)$ is a symmetric matrix and $\|n\| = 1$, from matrix theory [17] we have $$\lambda_m \leq n^T M_y^{-1} n \leq \lambda_1 \qquad (54)$$

where $\lambda_m$ and $\lambda_1$ are the smallest and largest eigenvalues of $M_y^{-1}$. Hence, the impact force magnitude $\hat{\mathcal{F}}_c$ is bounded by $$-(1+e) \dot{Y}^T n \cdot \lambda_1^{-1}(\theta) \leq \hat{\mathcal{F}}_c \leq -(1+e) \dot{Y}^T n \cdot \lambda_m^{-1}(\theta) \qquad (55)$$

In order to utilize the redundancy to "soften" the impact for a given $\dot{Y}$ and n, we can define the objective function $L_c(\theta) = n^T M_y^{-1}(\theta) n$ and find the manipulator configuration $\theta$ that maximizes $L_c(\theta)$ subject to the end-effector motion. This can be achieved by formulating the additional task as $$N_e(\theta) \frac{\partial L_c}{\partial \theta} = 0 \qquad (56)$$

Alternatively, the upper-bound on $\hat{\mathcal{F}}_c$, namely $-(1+e) \dot{Y}^T n \cdot \lambda_m^{-1}(\theta)$ can be reduced by defining the objective function as $L_c(\theta) = \lambda_m(\theta)$ and finding the joint configuration $\theta$ that maximizes the smallest eigenvalue of $M_y^{-1}(\theta)$, namely $\lambda_m(\theta)$. Note that the reduction of impulsive force at impact can lead to undesirable manipulator configurations, and this goal may need to be considered in conjunction with other criteria. A numerical example is given in Section 3 for illustration.

3. Case Studies

In this section, we illustrate some of the concepts developed in the preceding section through simple examples.

Figure 2:
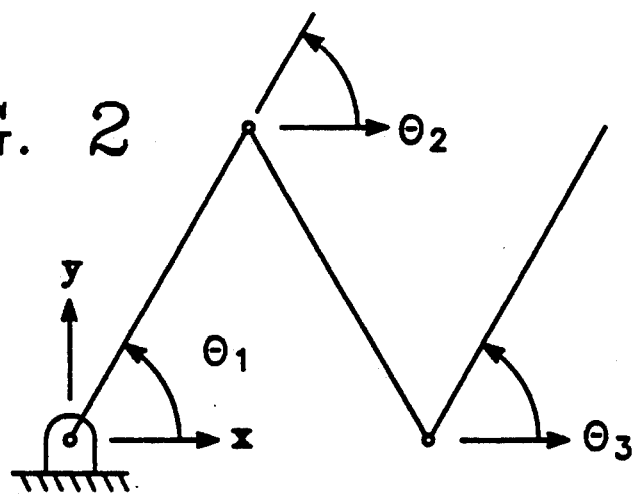
FIG. 2 illustrates a three link robot coordinate system employed in analyzing the invention.

Consider a planar three-link manipulator with no payload operating in a vertical plane as shown in FIG. 2. The forward kinematic equations relating the *absolute* joint angles $\theta = [\theta_1, \theta_2, \theta_3]^T$ (w.r.t. x-axis) to the tip (end-effector) position coordinates $Y = [x, y]^T$ in the base frame are given by $$x = \cos\theta_1 + \cos\theta_2 + \cos\theta_3 \qquad (57)$$
$$y = \sin\theta_1 + \sin\theta_2 + \sin\theta_3$$

where the link lengths are taken to be unity. The differential kinematic model is obtained as $$\begin{pmatrix} \dot{x} \\ \dot{y} \end{pmatrix} = \begin{pmatrix} -\sin\theta_1 & -\sin\theta_2 & -\sin\theta_3 \\ \cos\theta_1 & \cos\theta_2 & \cos\theta_3 \end{pmatrix} \begin{pmatrix} \dot{\theta}_1 \\ \dot{\theta}_2 \\ \dot{\theta}_3 \end{pmatrix} = J_e \dot{\theta} \qquad (58)$$

The 1×3 null-space spanning vector $N_e$ of the Jacobian $J_e$ is found by solving the equation $N_e J_e^T = 0$ to obtain $$N_e = [\sin(\theta_3 - \theta_2), \sin(\theta_1 - \theta_3), \sin(\theta_2 - \theta_1)] \qquad (59)$$

The dynamic model relating the joint torques $\mathcal{T} = [\tau_1, \tau_2, \tau_3]^T$ to the joint angles $\theta$ is found to be $$\mathcal{T} = M(\theta)\ddot{\theta} + N(\theta, \dot{\theta}) + G(\theta) + V\dot{\theta} \qquad (60a)$$

where the above terms are given by $M_{11} = 40 + 30 \cos(\theta_2 - \theta_1) + 10 \cos(\theta_3 - \theta_2) + 10 \cos(\theta_3 - \theta_1)$ $M_{12} = M_{21} = 16.67 + 15 \cos(\theta_2 - \theta_1) + 5 \cos(\theta_3 - \theta_1) + 10 \cos(\theta_3 - \theta_2)$ $M_{13} = M_{31} = 3.33 + 5 \cos(\theta_3 - \theta_2) + 5 \cos(\theta_3 - \theta_1)$ $M_{22} = 16.67 + 10 \cos(\theta - \theta_2)$ $M_{23} = M_{32} = 3.33 + 5 \cos(\theta_3 - \theta_2)$ $M_{33} = 3.33 \qquad (60b)$ $G_1 = 25 \, g \cos \theta_1 + 15 \, g \cos \theta_2 + 5 \, g \cos \theta_3$ $G_2 = 15 \, g \cos \theta_2 + 5 \, g \cos \theta_3 \qquad (60c)$ $G_3 = 5 \, g \cos \theta_3$ while $g = 9.81$ m/sec$^2$ is the gravitational constant, and the elements of N are complicated functions of $\theta$ and $\dot{\theta}$ given in Appendix 5.3. In the derivation of the dynamic model (60), it is assumed that the robot links can be modeled by thin uniform rods with masses of 10 Kg each, and the joint viscous friction coefficients are $V = \text{diag}(v_i)$, $v_1 = v_2 = v_3 = 30$ Nt.m./rad.sec.$^{-1}$. Since the end-effector workspace is of dimension two (m=2), the degree-of-redundancy of the manipulator is $r = n - m = 1$. This single degree-of-redundancy will now be used to achieve different additional tasks. Six cases are considered:

3.1 Mechanical-Advantage

In this case, the tip is assumed to be in contact with a frictionless horizontal reaction surface at $y = 1$ with stiffness coefficient $K_e = 100$, as shown in FIG. 2, and the desired contact force is represented by $$F = \begin{pmatrix} 0 \\ 1 \end{pmatrix}.$$

We wish to move the tip on the reaction surface with $F_y = 1$, while utilizing the redundancy to minimize the joint torques needed to produce $F_y$, thereby maximizing the mechanical-advantage of the manipulator.

The additional joint torque required for tip contact force is given by $$\mathcal{T}_F = J_e^T(\theta) F = \begin{pmatrix} \cos\theta_1 \\ \cos\theta_2 \\ \cos\theta_3 \end{pmatrix} \quad (61)$$

It is seen that for a given tip contact force F, the required joint torque $\mathcal{T}_F$ is independent on the manipulator configuration $\theta$. From Section 2.3, the mechanical-advantage of the manipulator $M_a = \|F\| / \|\mathcal{T}_F\|$ is bounded by $$\|J_e\| F^{-1} < \sigma_1^{-1} \leq M_a \leq \sigma_m^{-1}$$

Using the end-effector Jacobian matrix given in (58), the above bounds are found to be $$\frac{1}{\sqrt{3}} < \left[\frac{2}{3+\alpha}\right]^{1/2} \leq M_a \leq \left[\frac{2}{3-\alpha}\right]^{1/2}$$

where $$\alpha = [3 + 2\cos 2(\theta_1 - \theta_2) + 2\cos 2(\theta_1 - \theta_3) + 2\cos 2(\theta_2 - \theta_3)]^{\frac{1}{2}}$$

It is seen that the bounds on $M_a$ are dependent on the manipulator configuration $\theta$, and furthermore $\|\mathcal{T}_F\| < \sqrt{3} \|F\|$ regardless of F. In this case, since the direction of the applied force F is known, we can maximize $M_a$ by directly minimizing the joint torque norm $\|\mathcal{T}_F\|$. To this end, we utilize the redundancy to minimize the weighted sum-of-squares of joint torques $L_f$ defined as $$L_f = \mathcal{T} \| F \|_w^2 = w_1 \tau_{f1}^2 + w_2 \tau_{f2}^2 + w_3 \tau_{f3}^2 \quad (62)$$
$$= w_1 \cos^2\theta_1 + w_2 \cos^2\theta_2 + w_3 \cos^2\theta_3$$

where $\{w_1, w_2, w_3\}$ are the joint weighting factors. The gradient of $L_f$ is obtained as $$\frac{\partial L_f}{\partial \theta} = \begin{pmatrix} -w_1 \sin 2\theta_1 \\ -w_2 \sin 2\theta_2 \\ -w_3 \sin 2\theta_3 \end{pmatrix}$$

The condition for optimality of $L_f$ is now given by $$\phi(\theta) = N_e \frac{\partial L_f}{\partial \theta} = 0,$$

where $$\phi(\theta) = w_1 \sin(\theta_3 - \theta_2) \sin 2\theta_1 + w_2 \sin(\theta_1 - \theta_3) \sin 2\theta_2 + w_3 \sin(\theta_2 - \theta_1) \sin 2\theta_3$$

To simplify the analysis, suppose that $w_1 = 1$, $w_2 = w_3 = 0$ so that only the torque on joint 1, namely $\tau_{f1} = \cos\theta_1$, is optimized. Then, the optimality condition simplifies to $$\phi(\theta) = \sin(\theta_3 - \theta_2) \sin 2\theta_1 = 0 \quad (63)$$

To apply the constant tip force of $F_y = 1$ in the y-direction, the tip vertical coordinate must satisfy the Hooke's law $$F_y = K_e \Delta y$$

or $$\Delta y = F_y / K_e \quad (64)$$

Suppose that the initial joint angles are $\theta^0 = [90°, -45°, 45°]^T$ so that initially the tip is at $x_0 = \sqrt{2}$, $y_0 = 1$ and the optimality condition (63) is met with $\tau_{f1} = 0$. Then the desired trajectory for the tip y-coordinate is $$y_d(t) = y_0 + F_y / K_e = 1 + 1/100 \quad (65)$$

Let the desired trajectory for the tip x-coordinate be given by $$x_d(t) = \sqrt{2} + \frac{1}{3}(1 - \cos 0.5t) \quad (66)$$

In order to control the tip as well as minimize the joint torque $\tau_{f1}$, we require the following conditions $$x(\theta) = \cos\theta_1 + \cos\theta_2 + \cos\theta_3 = \sqrt{2} + \frac{1}{3}(1 - \cos 0.5t) \quad (67)$$

$$y(\theta) = \sin\theta_1 + \sin\theta_2 + \sin\theta_3 = 1.01$$

$$\phi(\theta) = \sin(\theta_3 - \theta_2) \sin 2\theta_1 = 0$$

Figure 3A:
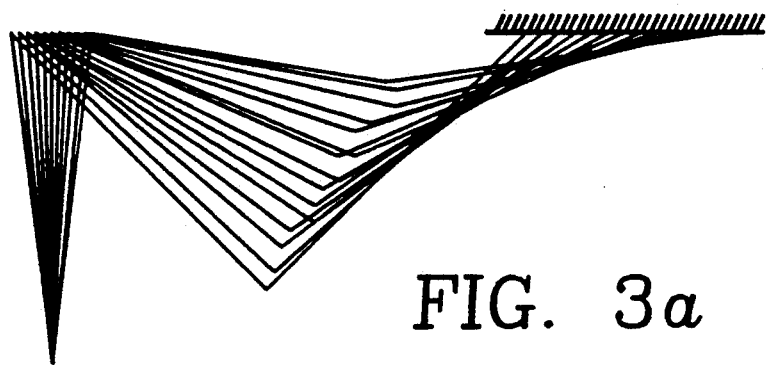
FIGS. 3a-3d illustrate, respectively, robot configurations, tip x-position response, tip y-contact force and variation of kinematic function in one application of the invention.
Figure 3B:
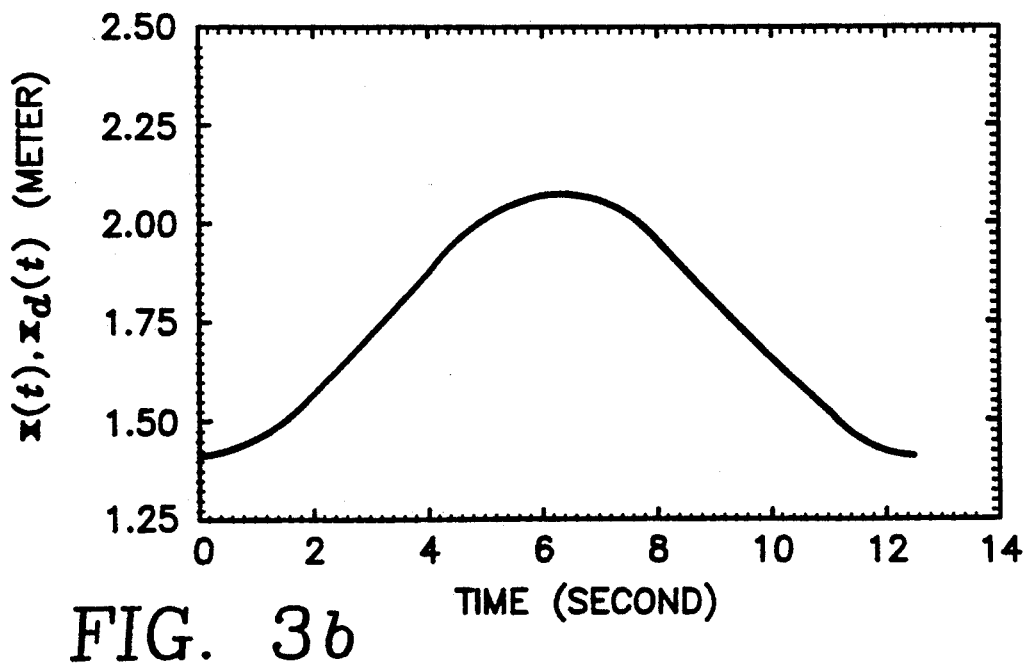
Figure 3C:
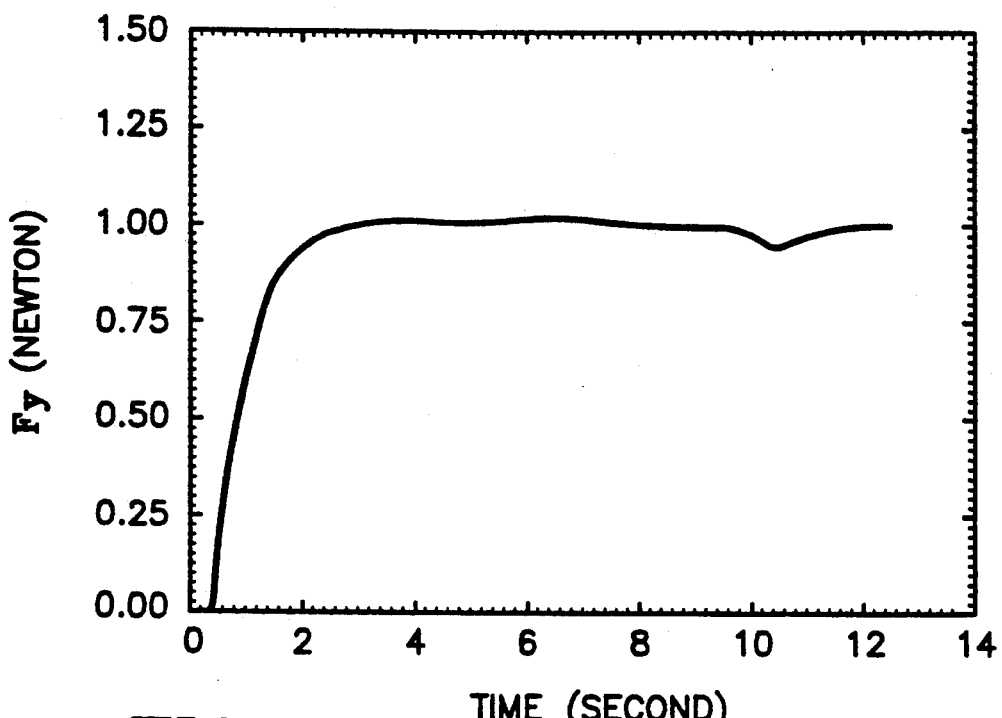
Figure 3D:
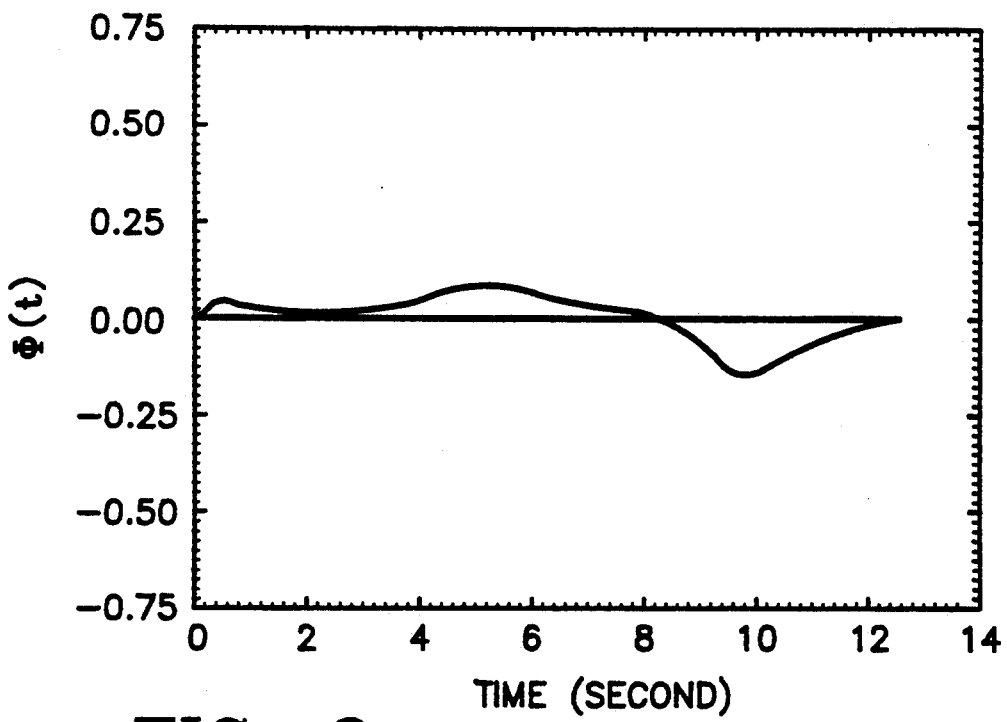

The robot dynamic model (60) and the configuration controller given in Appendix 5.4 are simulated on a DECstation 3100 computer with a sampling period of one millisecond. The simulation results are shown in FIGS. 3a–3d. FIG. 3a shows the evolution of the robot configuration throughout the task. It is seen that link 1 is kept as closely as possible to the initial optimal configuration $\theta_1 = 90°$ (i.e., vertical) so that $\tau_{f1}$ is small, subject to performing the specified tip motion. FIGS. 3b and 3c illustrate that the tip x-position and y-contact force track their desired trajectories very closely. The variation of the kinematic function $\phi$ representing the optimality condition is shown in FIG. 3d. It is seen that $\phi$ stays close to its initial value of zero throughout the task.

Finally, from (61), it is observed that the joint torque $T_F$ corresponding to the tip force F attains its minimum value of zero when $\theta_1=\theta_2=\theta_3=90°$, disregarding the tip position constraint. This corresponds to the robot fully stretched out vertically, which puts the robot in a singular configuration with the tip on the workspace boundary. In other words, the maximally singular configuration of the robot results in the absolute minimum joint torque for a given tip force, and hence maximum mechanical-advantage. Therefore, in order to preclude singular configurations, the maximization of mechanical-advantage must be considered in conjunction with other criteria such as manipulability [6].

3.2 Gravitational Torque

In this case, we wish to move the tip on a circular path, while utilizing the redundancy to minimize the gravity loadings on the joints.

From (60c), the component of joint torques due to gravity loading is given by $$T_g = G(\theta) = 5 \begin{pmatrix} 5\cos\theta_1 + 3\cos\theta_2 + \cos\theta_3 \\ 3\cos\theta_2 + \cos\theta_3 \\ \cos\theta_3 \end{pmatrix} g \quad (68)$$

It is seen that for a given tip position, the joint torque $T_g$ due to gravity loading is configuration-dependent. The goal for redundancy resolution in this case is to configure the internal links of the robot such that a weighted sum-of-squares of gravity torques $L_g$ is minimized, that is $$L_g = \|T_g\|_w^2 = w_1\tau_{g1}^2 + w_2\tau_{g2}^2 + w_3\tau_{g3}^2 \quad (69)$$
$$= 25g^2w_1[5\cos\theta_1 + 3\cos\theta_2 + \cos\theta_3]^2 +$$
$$25g^2w_2[3\cos\theta_2 + \cos\theta_3]^2 + 25g^2w_3[\cos\theta_3]^2$$

where $\{w_1, w_2, w_3\}$ are the joint weighting factors. For instance, let us choose $w_1=w_2=0$, $w_3=1$ so that only the gravity torque on joint 3, namely $\tau_{g3}=5g\cos\theta_3$, is optimized. Thus, we obtain $$L_g = 25g^2\cos^2\theta_3 \quad (70a)$$

$$\frac{\partial L_g}{\partial \theta} = \begin{pmatrix} 0 \\ 0 \\ -25g^2\sin 2\theta_3 \end{pmatrix} \quad (70b)$$

Therefore, in order to optimize $L_g$ subject to the tip constraint, we require $$N_e \frac{\partial L_g}{\partial \theta} = -25g^2 \sin(\theta_2 - \theta_1)\sin 2\theta_3 = 0 \quad (71)$$

Suppose that the reaction surface used in Case One is removed (i.e., F=0), and the tip is free to move in both x and y directions. Initially, the joint angles are $\theta^0=[45°, -45°, 90°]^T$ and hence the tip is at $x_0=\sqrt{2}$, $y_0=1$ and the optimality condition (56) is met with $\tau_{g3}=0$. Let the desired tip trajectories be given by $$x_d(t) = \sqrt{2} + \sin 0.5t \quad (72)$$
$$y_d(t) = \cos 0.5t$$

so that the tip traces a circle with center $(x=\sqrt{2}, y=0)$ and radius 1; since we have $(x_d-\sqrt{2})^2 + y_d^2 = 1$. Therefore, for tip motion and gravity optimization, we require $$x(\theta) = \cos\theta_1 + \cos\theta_2 + \cos\theta_3 = \sqrt{2} + \sin 0.5t \quad (73)$$
$$y(\theta) = \sin\theta_1 + \sin\theta_2 + \sin\theta_3 = \cos 0.5t$$
$$\phi(\theta) = \sin(\theta_2 - \theta_1)\sin 2\theta_3 = 0$$

Figure 4A:
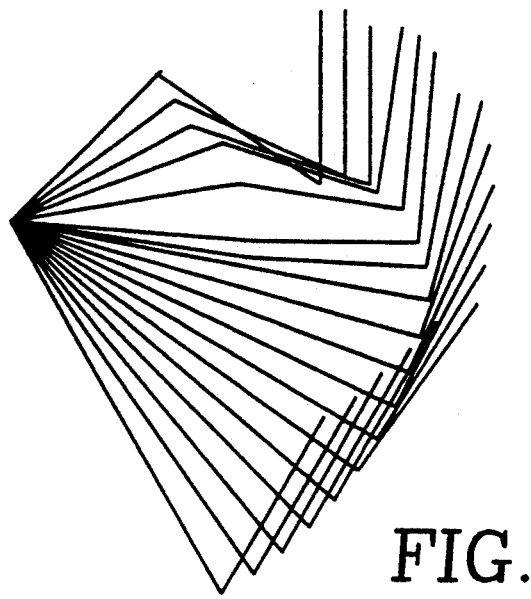
FIGS. 4a-4d illustrate, respectively, robot configurations, tip x-position response, tip y-contact force and variation of kinematic function in another application of the invention.
Figure 4B:
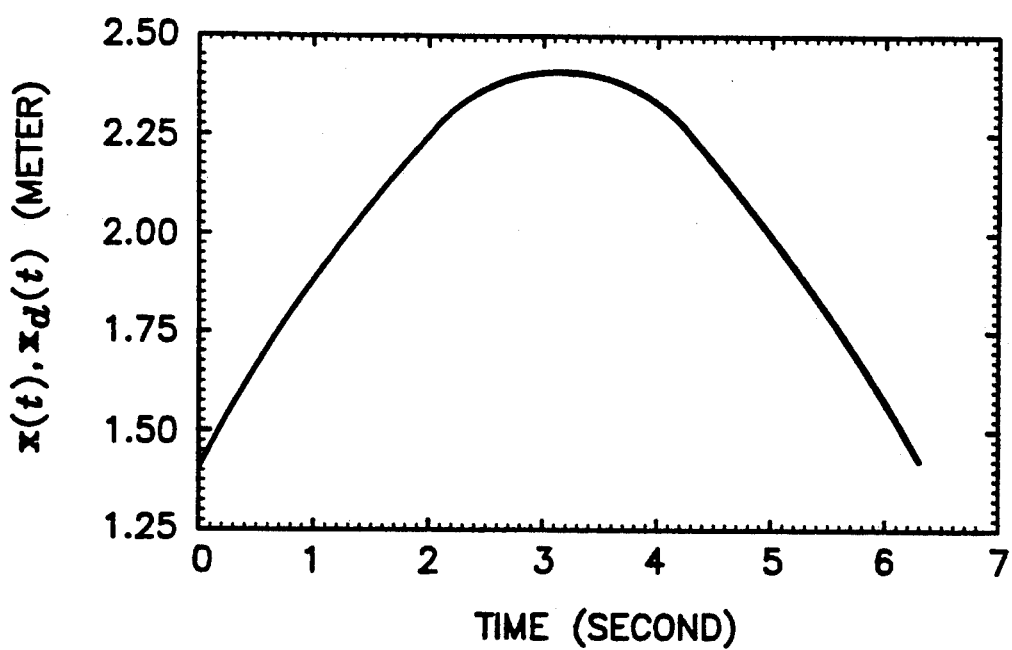
Figure 4C:
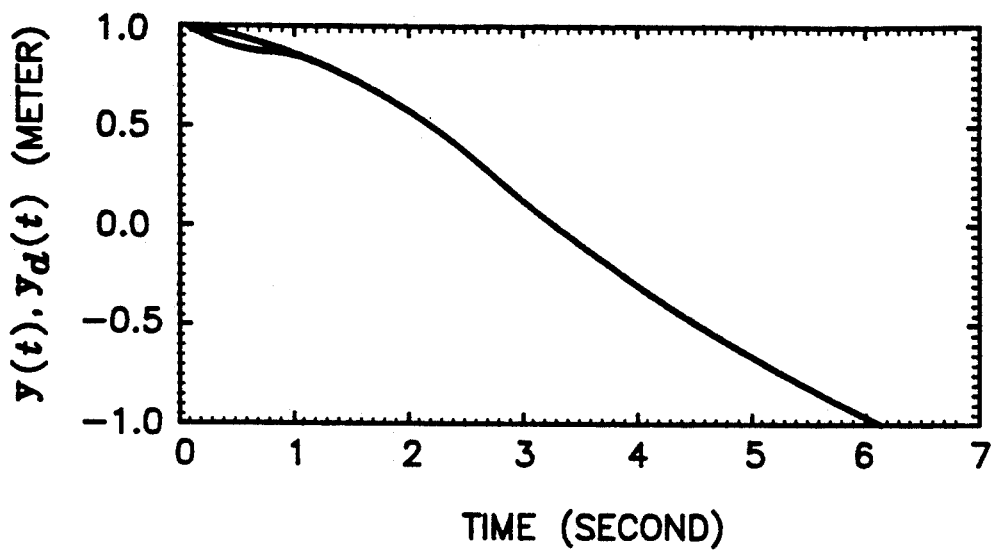
Figure 4D:
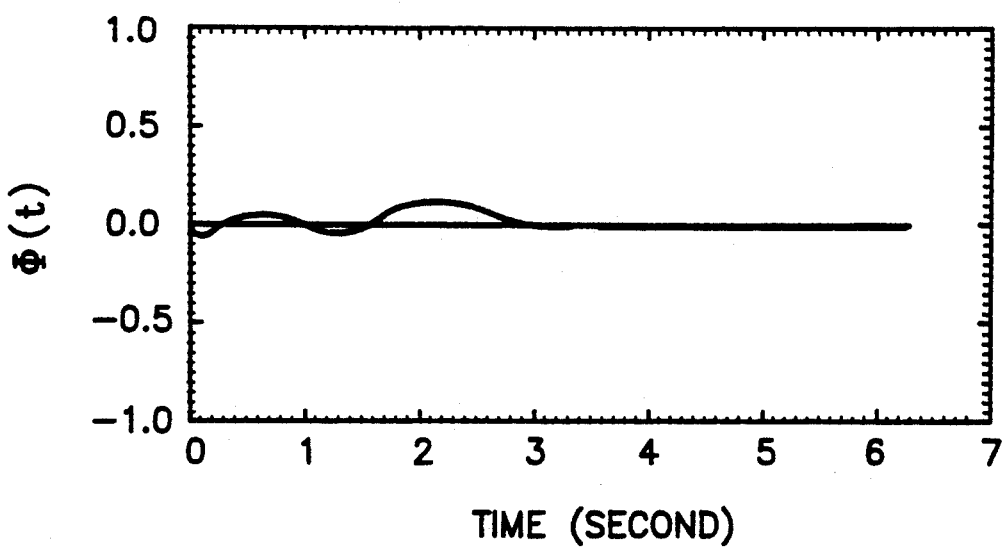

The robot dynamics (60) and the configuration controller in Appendix 5.4 are simulated, and the simulation results are presented in FIGS. 4a–4d. The evolution of the robot configuration throughout the motion is shown in FIG. 4a. It is seen that link 3 stays as closely as possible to the initial optimal configuration $\theta_3=90°$ (i.e., vertical) so that $\tau_{g3}$ is small, compatible with the execution of the specified tip motion. FIGS. 4b and 4c show the responses of the tip x and y coordinates, and illustrate that the desired trajectories $x_d$ and $y_d$ are tracked very closely. The variation of the kinematic function $\phi$ is depicted in FIG. 4d, which shows that $\phi$ stays close to its desired value $\phi_d=0$ throughout the task.

3.3 Inertia Control

In this case, we wish to move the tip on the vertical straight line at x=1.5, while utilizing the redundancy to make the inertia seen at joint 1 configuration-invariant throughout the tip motion.

From (60b), it is seen that the joint inertia matrix $M(\theta)$ is dependent only on the manipulator configuration $\theta$. Thus, the redundancy can be resolved based on the inertia matrix. For instance, let the initial joint angles be $\theta^0=[60°, -60°, 60°]^T$ so that the tip is initially at $x_0=1.5$, $$y_0 = \frac{\sqrt{3}}{2},$$

and from (60b) the initial value of joint 1 inertia is $$M_{11}(\theta^0)=40+30\cos(\theta_{20}-\theta_{10})+10\cos(\theta_{30}-\theta_{20})+10\cos(\theta_{30}-\theta_{10})=30 \quad (74)$$

Let the desired trajectories for the tip coordinates be $$x_d(t) = 1.5 \quad (75)$$
$$y_d(t) = \frac{\sqrt{3}}{2}\cos 0.5t$$

Therefore, in order to keep $M_{11}(\theta)$ constant and control the tip coordinates, we need $$x(\theta) = \cos\theta_1 + \cos\theta_2 + \cos\theta_3 = 1.5 \quad (76)$$
$$y(\theta) = \sin\theta_1 + \sin\theta_2 + \sin\theta_3 = \frac{\sqrt{3}}{2}\cos 0.5t$$
$$M_{11}(\theta) = 40 + 30\cos(\theta_2 - \theta_1) + 10\cos(\theta_3 - \theta_2) +$$

-continued $$10\cos(\theta_3 - \theta_1) = 30$$

Figure 5A:
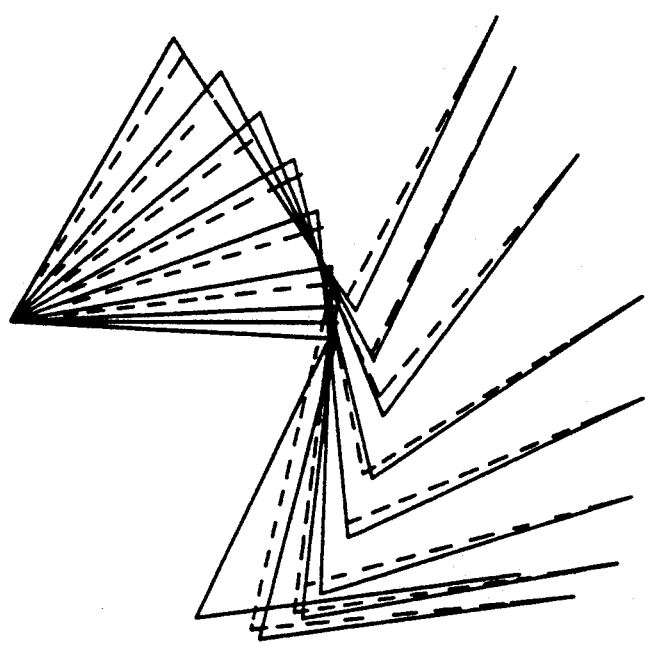
FIGS. 5a-5d illustrate, respectively, robot configurations, tip x-position response, tip y-contact force and variation of kinematic function in yet another application of the invention.
Figure 5B:
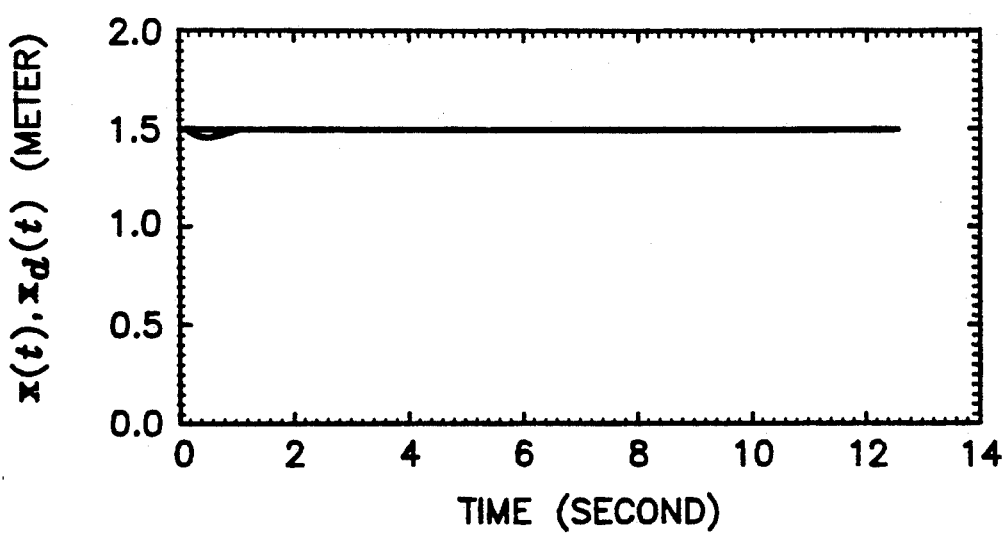
Figure 5C:
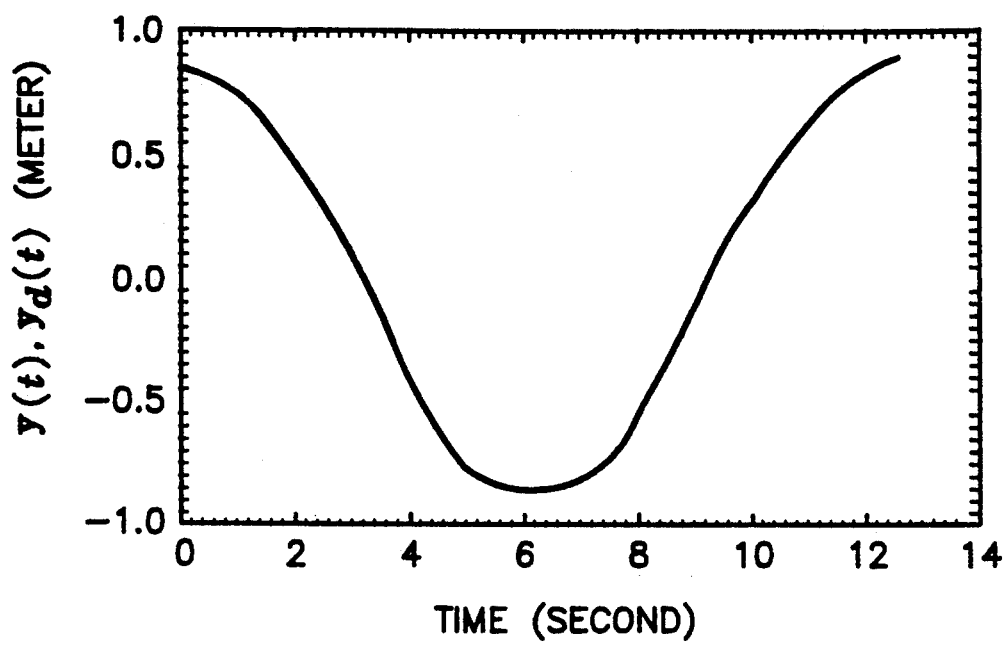
Figure 5D:
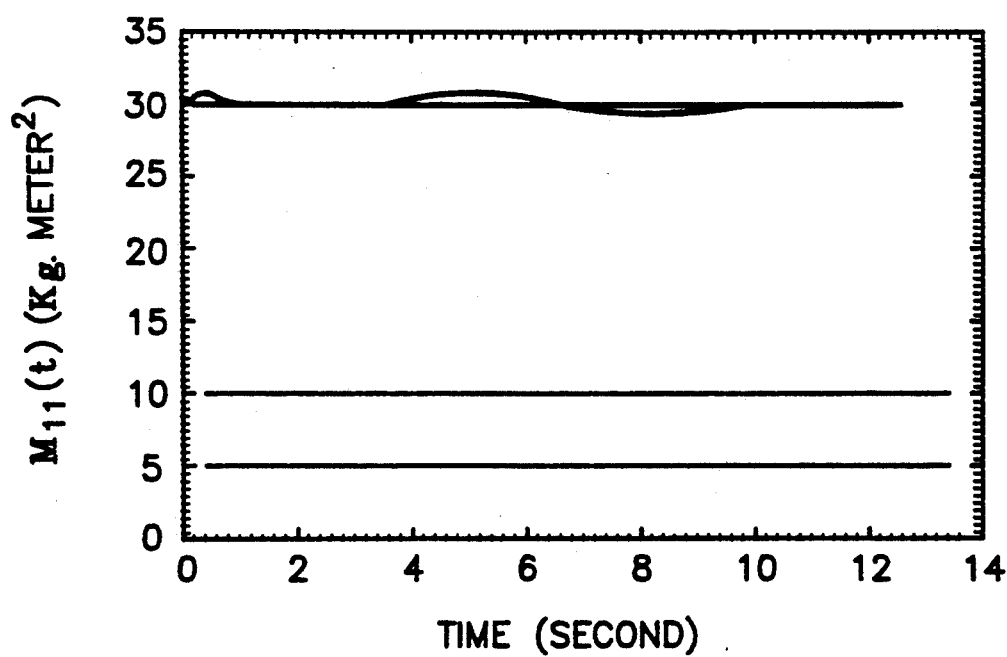

The robot dynamics (60) and the configuration controller in Appendix 5.4 are simulated, and the simulation results are given in FIGS. 5a–5d. FIG. 5a depicts the evolution of the robot configuration during the task. It is observed that as the tip moves closer to the base in mid-motion and joint 1 inertia is decreased, the inner links move outward to increase the inertia, so as to maintain the total inertia $M_{11}$ constant. For some tip trajectories, it may not be possible to keep $M_{11}$ constant throughout the motion; e.g., when the tip is required to move out toward the workspace boundary, all links have to move out accordingly and $M_{11}$ is increased inevitably. However, in this case, the variations of $M_{11}$ from its initial value $M_{11}(\theta^\circ)$ can be minimized. FIGS. 5b and 5c show that the tip x and y coordinates track their reference trajectories very closely. The variation of the joint 1 inertia is depicted in FIG. 5d and indicates the invariance of $M_{11}(\theta)$ throughout the motion.

3.4 Compliance Control

The goal for redundancy resolution in this case is to maintain a constant tip compliance while the tip is traversing a prescribed path.

The compliance matrix $C(\theta)$ relating the tip forces to the tip deflections is given by (43) as $$C(\theta) = J_e(\theta) K^{-1} J_e^T(\theta) = \begin{pmatrix} \dfrac{\sin^2\theta_1}{k_1} + \dfrac{\sin^2\theta_2}{k_2} + \dfrac{\sin^2\theta_3}{k_3} & -\dfrac{\sin 2\theta_1}{2k_1} - \dfrac{\sin 2\theta_2}{2k_2} - \dfrac{\sin 2\theta_3}{2k_3} \\ -\dfrac{\sin 2\theta_1}{2k_1} - \dfrac{\sin 2\theta_2}{2k_2} - \dfrac{\sin 2\theta_3}{2k_3} & \dfrac{\cos^2\theta_1}{k_1} + \dfrac{\cos^2\theta_2}{k_2} + \dfrac{\cos^2\theta_3}{k_3} \end{pmatrix} \quad (77)$$

where $\{k_1, k_2, k_3\}$ are the joint stiffness coefficients. Let us suppose that $k_1 = k_2 = k_3 = 0.1$ and the tip is carrying a payload of mass m so that the Cartesian force $$F = \begin{pmatrix} 0 \\ -mg \end{pmatrix}$$

is acting on the tip. The tip deflection caused by the payload is $$\Delta Y = C(\theta)F = -5\,mg \begin{pmatrix} -\sin 2\theta_1 - \sin 2\theta_2 - \sin 2\theta_3 \\ 2\cos^2\theta_1 + 2\cos^2\theta_2 + 2\cos^2\theta_3 \end{pmatrix} \quad (78)$$

We now wish to utilize the redundancy to ensure that the tip vertical deflection under the payload is independent of the robot configuration. The robot is assumed to be initially at $\theta^0 = [90^\circ, 0^\circ, -90^\circ]^T$, so that the tip is at $x_0 = 1$, $y_0 = 0$, and the corresponding tip y-compliance is $c_{22}(\theta^0) = 10$. We wish to keep $c_{22}(\theta)$ constant while moving the tip on the vertical straight line at $x = 1$. This requires $$x(\theta) = \cos\theta_1 + \cos\theta_2 + \cos\theta_3 = 1$$

$$y(\theta) = \sin\theta_1 + \sin\theta_2 + \sin\theta_2 = 0.5(1 - \cos 0.5t) \quad (79)$$

$$c_{22}(\theta) = 10(\cos^2\theta_1 + \cos^2 + \cos^2\theta_3) = 10$$

Figure 6A:
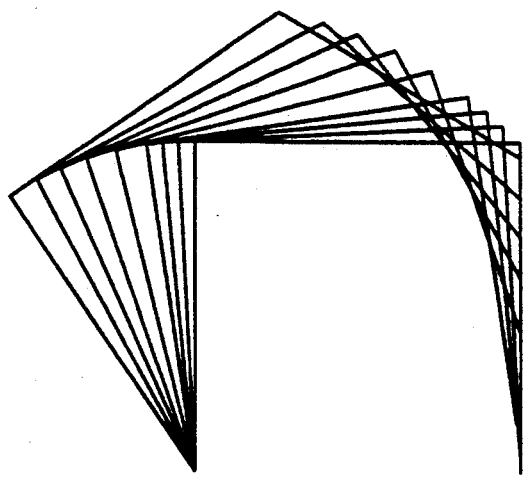
FIGS. 6a-6d illustrate, respectively, robot configurations, tip x-position response, tip y-contact force and variation of kinematic function in a further application of the invention.
Figure 6B:
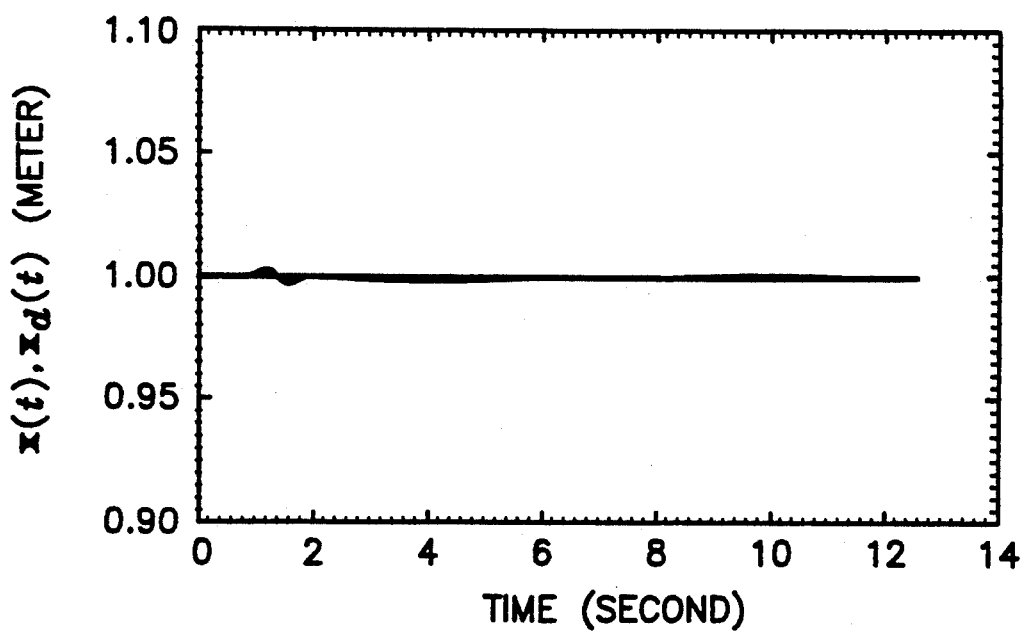
Figure 6C:
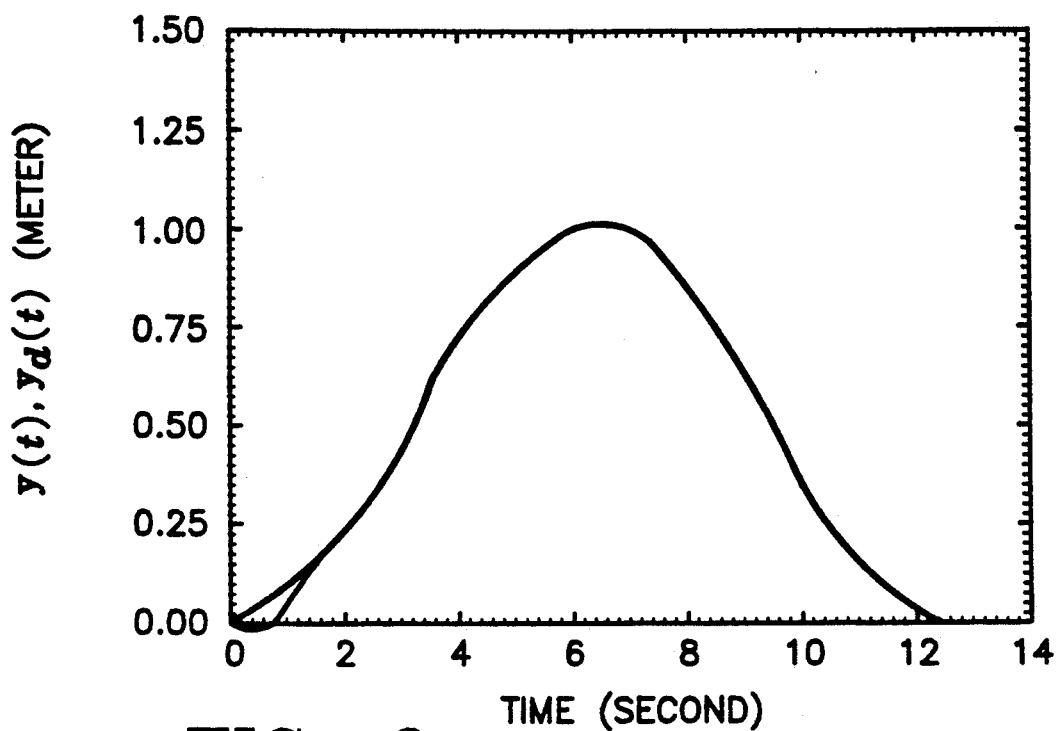
Figure 6D:
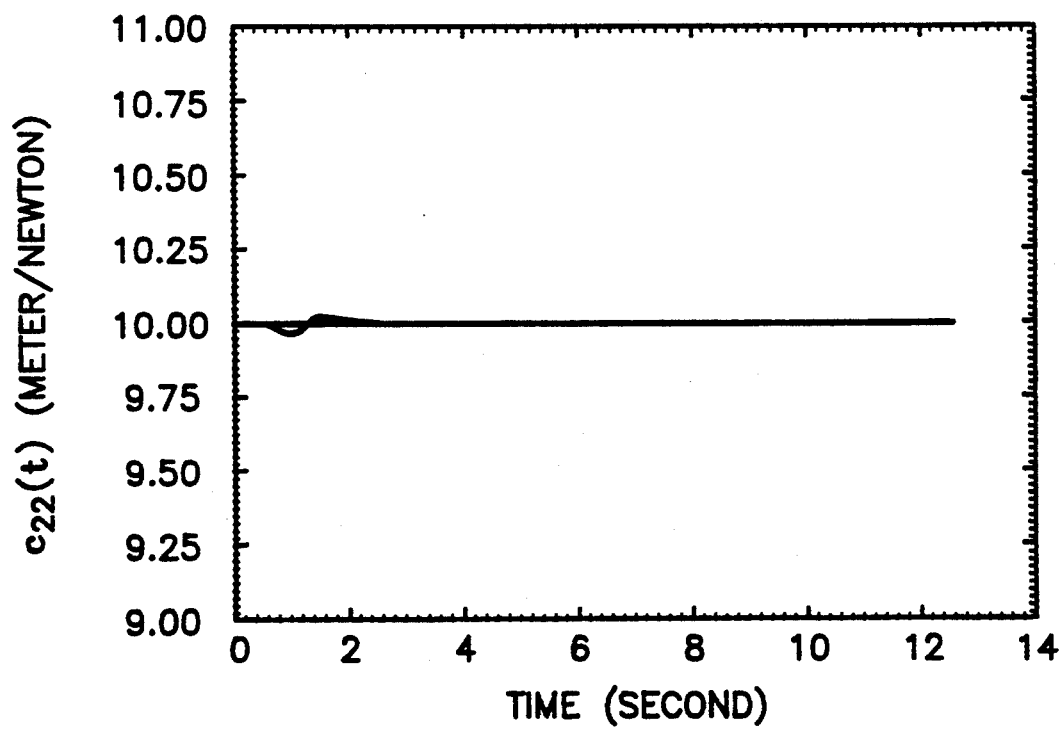

The robot dynamics (60) and the configuration controller in Appendix 5.4 are simulated, and the results are presented in FIGS. 6a–6d. The evolution of the robot configuration in FIG. 6a shows the internal movement of the robot links to maintain the compliance $c_{22}(\theta)$ constant. FIGS. 6b–6d show the variations of the tip x and y coordinates and compliance $c_{22}(\theta)$, and illustrate that close trajectory tracking is achieved throughout the motion.

3.5 Tip Sensitivity

In this case, the tip is assumed to be at the point $P[x=0, y=(1+\sqrt{7})/\sqrt{2}]$, and make contact with a stiff horizontal reaction surface at $y = (1+\sqrt{7})/\sqrt{2}$. We wish to find the optimal configuration of the manipulator so that the joint displcements $\Delta\theta = (\Delta\theta_1, \Delta\theta_2, \Delta\theta_3)^T$ due to servo errors have the least effect on the y-coordinate of the tip, i.e., the sensitivity of y to $\Delta\theta$ is minimized. This is because any perturbation $\Delta y$ in y will be magnified by the stiffness K of the reaction surface and will produce and undesirable additional contact force $K\Delta y$.

To find the optimal configuration, we first parameterize the self-motion of the manipulator in terms of the first joint angle $\theta_1$ for the given tip location $P = [0, (1+\sqrt{7}/\sqrt{2}]$. A simple geometrical anaylsis shows that the range of variation of $\theta_1$ which keeps the tip fixed at P is given by $45^\circ \leq \theta_1 \leq 135^\circ$. Let the points A and B represent the ends of the first and second links of the arm. For each value of $\theta_1$, the point A is fixed and we have a two-link arm (AB, BP) formed from the second and third links. Given A and P, there are two inverse kinematic solutions $AB_1P$ and $AB_2P$ for $(\theta_2, \theta_3)$ corresponding to the "elbow-up" and "elbow-down" configurations. Because of symmetry of the solutions, here we only consider the "elbow-up" solution $AB_1P$ for which $B_1$ is to the right-hand side of $B_2$. We now wish to find the value of $\theta_1$, the redundancy parameter, for which the tip sensitivity in the y-direction is minimized given the joint displacements $\Delta\theta$. From Section 2.5, the tip and joint displacements are related through the Jacobian matrix $J_e$ as $$\begin{pmatrix} \Delta x \\ \Delta y \end{pmatrix} = \begin{pmatrix} -\sin\theta_1 & -\sin\theta_2 & -\sin\theta_3 \\ \cos\theta_1 & \cos\theta_2 & \cos\theta_3 \end{pmatrix} \begin{pmatrix} \Delta\theta_1 \\ \Delta\theta_2 \\ \Delta\theta_3 \end{pmatrix} \quad (80)$$

Hence the objective function to be minimized is given by $$L = (\Delta y)^2 = (\Delta\theta_1 \cos\theta_1 + \Delta\theta_2 \cos\theta_2 + \Delta\theta_3 \cos\theta_3)^2 \quad (81)$$

The necessary condition for optimality subject to the tip constraint is $$\phi(\theta) = N_e \frac{\partial L}{\partial \theta} = 0$$

where $N_e$ is given by (59), that is $$2[\Delta\theta_1 \cos\theta_1 + \Delta\theta_2 \cos\theta_2 + \Delta\theta_3 \cos\theta_3][\Delta\theta_1 \sin\theta_1 \sin(\theta_2 - \theta_3) + \Delta\theta_2 \sin\theta_2 \sin(\theta_3 - \theta_1) + \Delta\theta_3 \sin\theta_3 \sin(\theta_1 - \theta_2)] = 0 \quad (82)$$

Figure 7A:
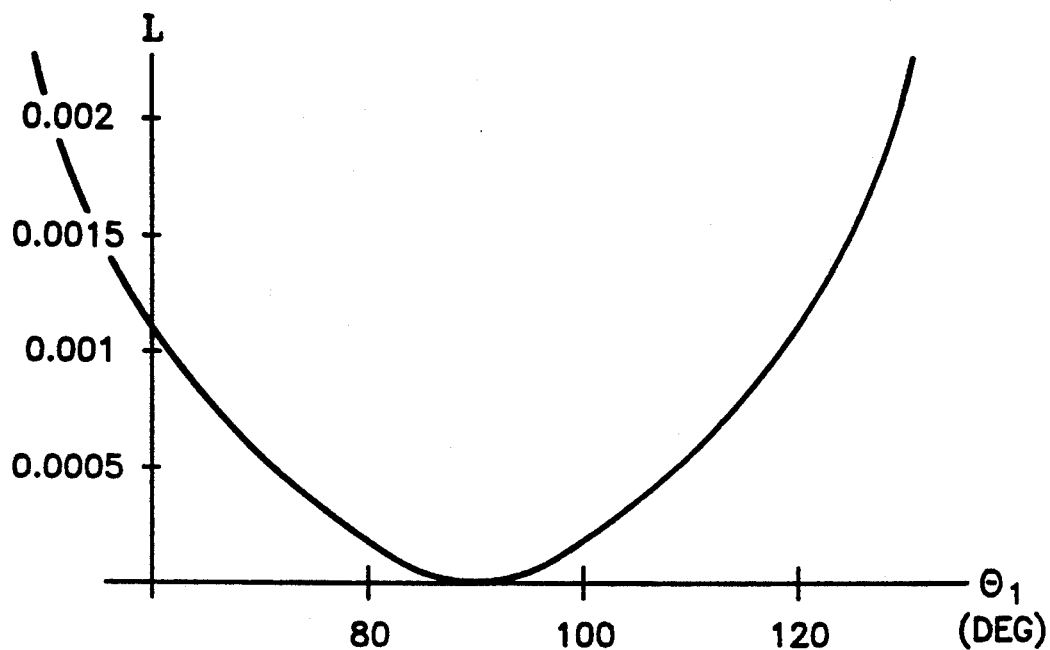
FIGS. 7a and 7b illustrate, respectively, variation of a sensitivity function and variation of a kinematic function in a still further application of the invention.
Figure 7B:
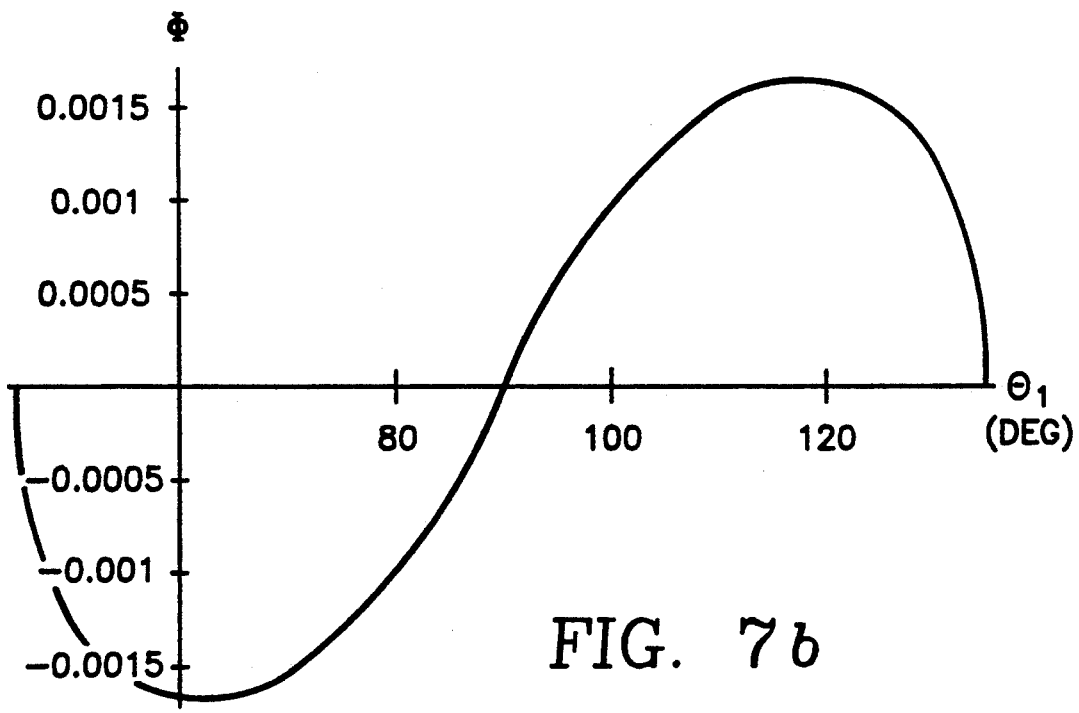

Given the numerical values of the joint displacements as $\Delta\theta=]5°, 1°, 1°]$ the value of the objective function L and its projected gradient $\phi(\theta)$ are plotted in FIGS. 7a–7b for variations in the redundancy parameter $\theta_1$. From FIG. 7a, for the "elbow-up" solution, the optimum configuration of the manipulator for which the tip y-sensitivity is minimized is found to be $$\theta_1=90°, \theta_2=52.09°, \theta_3=127.91° \quad (83)$$

Note that since $\Delta\theta_2=\Delta\theta_3$ in this case, the contributions from joints 2 and 3 to the tip displacement $\Delta y$ cancel out, and the value of $\theta_1=90°$ makes the contribution of $\Delta\theta_1$ to $\Delta y$ zero. Furthermore, note that from FIG. 7b, the necessary condition for optimality is satisfied at three different sets of joint angles. However, from FIG. 7a, the other two sets do not correspond to truly optimal solutions.

3.6 Impact Force

Figure 8A:
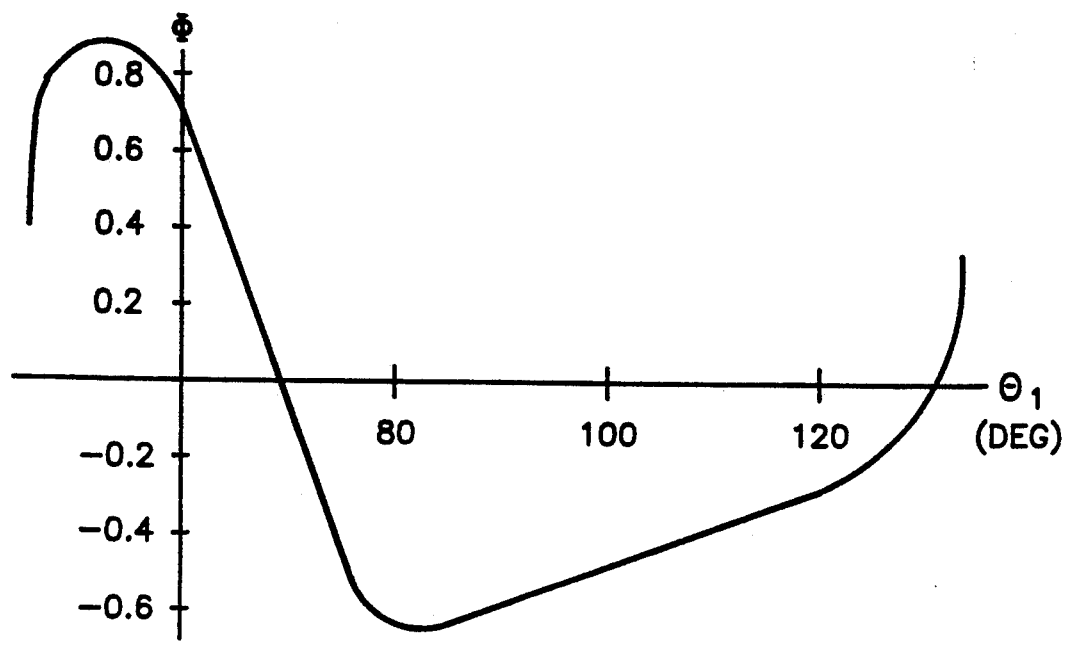
FIGS. 8a and 8b illustrate, respectively, variation of a sensitivity function and variation of a kinematic function in still another application of the invention.
Figure 8B:
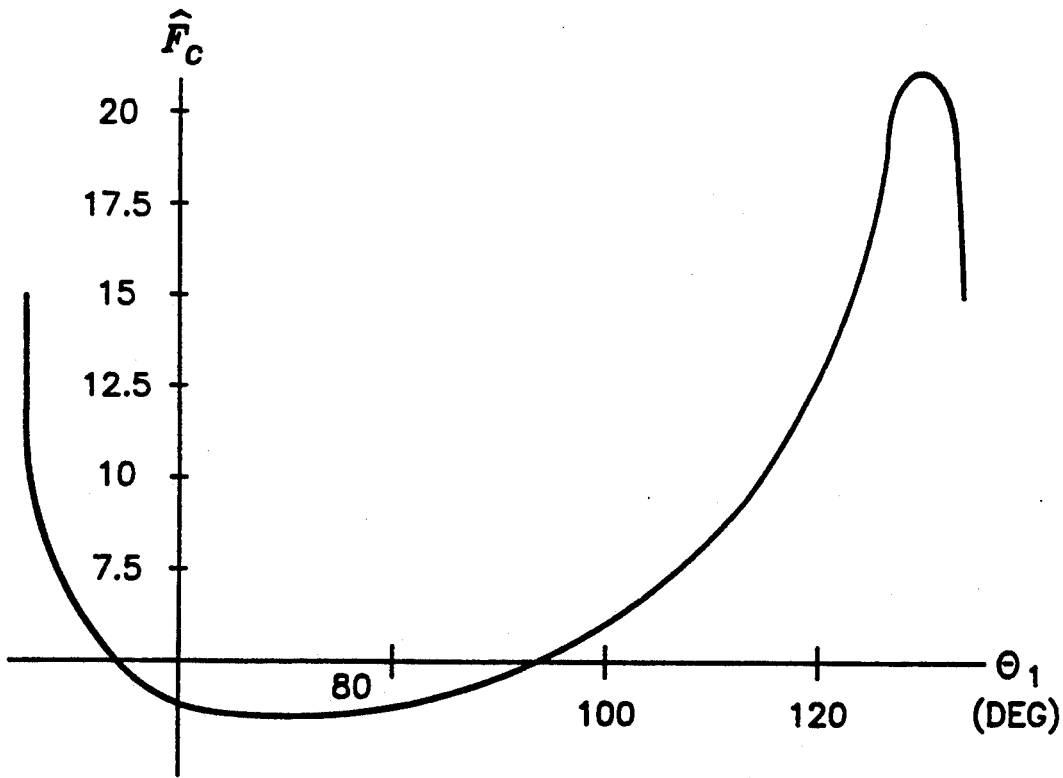

In this case, the redundancy is utilized to reduce the impulsive force when the tip impacts a reaction surface and the collision has the coefficient of restitution $e=1$. As in Section 3.5, suppose that the reaction surface is located at $y=(1+\sqrt{7})/\sqrt{2}$, and the tip is moving toward the contact point $P[x=0, y=(1+\sqrt{7})/\sqrt{2}]$ on the surface with the approaching Cartesian velocity $\dot{Y}=[0\ 1]^T$ just before impact. From Section 2.7, the magnitude of the impact force is given by $$\hat{F}_c = \frac{-(1+e)\dot{Y}^T n}{n^T M_y^{-1}(\theta)n} = \frac{2}{[M_y^{-1}(\theta)]_{2,2}} \quad (84)$$

where $n=[0\ 1]^T$, $M_y^{-1}=J_e M^{-1} J_e^T$, and the subscript 2,2 refers to the (2,2) element of the matrix. It is seen that the size of the impact force $\hat{F}_c$ is dependent on the manipulator configuration $\theta$, and can therefore be affected through redundancy resolution. As in Section 3.5, the redundancy is parameterized in terms of the first joint angle $\theta_1$, while the remaining joint angles $\theta_2$ and $\theta_3$ are solved for given $\theta_1$ and the tip position (x,y). In order to find the optimal value of $\theta_1$ that minimizes $\hat{F}_c$, we define $L(\theta)=[M_y^{-1}(\theta)]_{2,2}$ as the objective function and express the necessary condition for optimality as $\phi(\theta)=0$, where $$\phi(\theta) = J_e(\theta) \frac{\partial L(\theta)}{\partial \theta}$$

is the projected gradient of L. FIG. 8a shows the variation of the kinematic function $\phi(\theta)$ representing the optimality condition as a function of the redundancy parameter $\theta_1$ for the "elbow-up" solution. It is seen that $\phi(\theta)=0$ when $\theta_1=67.95°$ or $\theta_1=132.80°$, indicating that the impact force magnitude $\hat{F}_c$ will have extrimums (maximum or minimum) at these two values of $\theta_1$. FIG. 8b shows the variation of $\hat{F}_c$ as a function of $\theta_1$. It is seen that the impact force magnitude $\hat{F}_c$ varies in the range (3.4, 20.5) when $\theta_1$ changes in the allowable range (45°, 135°), with the maximum occuring at $\theta_1=132.80°$. The minimum value of $\hat{F}_c$ at 3.4 is found to occur for $\theta_1=67.95°$ and the corresponding values of $\theta_2$ and $\theta_3$ for the "elbow-up" solution are found to be $\theta_2=70.65°$ and $\theta_3=134.96°$. Hence the optimal arm configuration $$\theta = [67.95°, 70.65°, 134.96°]^T \quad (85)$$

prior to contact produces the minimal impulsive force at impact with the reaction surface. Note that in this case the links one and two are nearly colinear (to within 2.7°) which is not a desirable configuration from the manipulability point of view.

4. Conclusions

New goals for redundancy resolution based on manipulator dynamics and end-effector characteristics are introduced in this specification. These goals include reduction of joint torques due to gravity or inertial effects and improvement of mechanical advantage, velocity ratio, end-effector compliance, sensitivity or impact force. Thus in the manipulator dynamic model, the static torques due to payload, contact force and gravity loading can be controlled directly, while the inertial torque can be influenced through the end-effector mass matrix. The configuration control approach used previously to obtain desirable kinematic characteristics is now employed to improve end-effector or dynamics-based measures of performance. Although some of the goals for redundancy resolution described here can be computationally intensive for on-line control implementation, they provide a viable approach for off-line motion planning. The control schemes presented in this specification utilize the redundancy of a robot based on the task to be performed. These task-based redundancy resolution schemes exploit the redundant joints to a much greater extent.

There is a subtle difference in optimization using the conventional Jacobian pseudoinverse control and the configuration control approach. In the pseudoinverse control, the objective function L is locally improved (increased or decreased) at each incremental step, and is not necessarily optimized (maximized or minimized) during the end-effector motion. In other words, the pseudoinverse control provides a feasible direction without solving the complete optimization problem [5]. In the configuration control approach, however, the optimality condition (i.e., $$N_e \frac{\partial L}{\partial \theta} = 0)$$

is forced explicitly as the additional task constraint during the end-effector motion, and thus locally optimal configurations are closely maintained throughout the trajectory. Note that for a general objective function $L(\theta)$, the gradient $\partial L/\partial \theta$ is not readily available analytically and must often be computed numerically using differencing.

The individual additional tasks described in this specification for redundancy resolution can be combined together with user-assigned priorities. In fact, it is often advisable to consider the main goal for redundancy resolution in conjunction with other criteria to ensure that the manipulator configuration is desirable from an overall standpoint. The "optimal" joint trajectory that will best satisfy the individual additional tasks, as well as the basic task of end-effector motion, can then be found using the method described in [14]. This framework can also be used to avoid potential conflicts between the end-effector motion and the redundancy resolution constraints, so that the end-effector tracking accuracy is not sacrificed unduely for satisfaction of the constraints [14].

Further research on expanding the redundancy resolution goals and improving the computational aspects of the end-effector and dynamics-based configuration control schemes is currently underway.

7. References

1. D. E. Whitney: "Resolved motion rate control of manipulators and human prostheses," IEEE Trans. Man-Machine Systems, Vol. MMS-10, No. 2, pp. 47–53, 1969.

2. A. Liégeois: "Automatic supervisory control of the configuration and behavior of multibody mechanisms," IEEE Trans. System, Man and Cybernetics, Vol. SMC-7, No. 12, pp. 868–871, 1977.

3. K. C. Suh and J. M. Hollerbach: "Local versus global torque optimization of redundant manipulators," Proc. IEEE Intern. Conf. on Robotic and Automation, pp. 619–624, Raleigh, April 1987.

4. O. Khatib: "The operational space formulation in the analysis, design, and control of robot manipulators," Proc. 3rd Intern. Symp. of Robotics Research, pp. 103–110, Gouvieux (France), October 1985.

5. R. Dubey and J. Y. S. Luh: "Redundant robot control using task based performance measures," Journal of Robotic Systems, Vol. 5, No. 5, pp. 409–432, 1988.

6. S. L. Chiu: "Task compatibility of manipulator postures," Intern. Journ. of Robotics Research, Vol. 7, No. 5, pp. 13–21, 1988.

7. I. D. Walker: "The use of kinematic redundancy in reducing impact and contact effects in manipulation," Proc. IEEE Intern. Conf. on Robotics and Automation, pp. 434–439, Cincinnati, May 1990.

8. A. A. Maciejewski and C. A. Klein: "Obstacle avoidance for kinematically redundant manipulators in dynamically varying environments," Intern. Journ. of Robotics Research, Vol. 4, No. 3, pp. 109–117, 1985.

9. H. Seraji: "Configuration control of redundant manipulators: Theory and implementation," IEEE Trans. Robotics and Automation, Vol. 5, No. 4, pp. 472–490, 1989.

10. H. Seraji: "Configuration control of redundant manipulators," Proc. NATO Advanced Research Workshop on 'Robots with Redundancy,' Salo (Italy), June 1988.

11. H. Seraji: "Theory and applications of configuration control for redundant manipulators," in the book series on *Control and Dynamic Systems*, C. T. Leondes (editor), Vol. 40, pp. 205–258, Academic Press, 1991.

12. J. Burdick and H. Seraji: "Characterization and control of self-motions in redundant manipulators," Proc. NASA Conf. on Space Telerobotics, Vol. 2, pp. 3–14, Pasadena, January 1989.

13. R. Colbaugh, H. Seraji, and K. Glass: "Obstacle avoidance for redundant robots using configuration control," Journal of Robotic Systems, Vol. 6, No. 6, pp. 721–744, 1989.

14. H. Seraji and R. Colbaugh: "Improved configuration control for redundant robots," Journal of Robotic Systems, Vol. 7, No. 6, pp. 897–928, 1990.

15. K. Kreutz, M. Long, and H. Seraji: "Kinematic analysis of 7 DOF anthropomorphic arms," Proc. IEEE Intern. Conf. on Robotics and Automation, pp. 824–830, Cincinnati, May 1990.

16. H. Seraji: M. Long, and T. Lee: "Configuration control of 7 DOF arms," Proc. IEEE Intern. Conf. on Robotics and Automation, pp. 1195–1200, Sacramento, April 1991.

17. J. N. Franklin: *Matrix Theory*, Prentice-Hall Inc., Englewood Cliffs (N.J.), 1968.

18. K. Cleary and D. Tesar: "Incorporating multiple criteria in the operation of redundant manipulators," Proc. IEEE Intern. Conf. on Robotics and Automation, pp. 618–624, Cincinnati, May 1990.

19. J. Wittenberg: "Dynamics of Systems of Rigid Bodies," B. G. Teubner, Stuttgart (Germany), 1977.

20. J. Baillieul: "Kinematic programming alternatives for redundant manipulators," Proc. IEEE Intern. Conf. on Robotics and Automation, pp. 722–728, St. Louis, March 1985.

While the invention has been described in detail by specific reference to preferred embodiments thereof, it is understood that variations and modifications thereof may be made without departing from the true spirit and scope of the invention.

5. Appendices

5.1 Condition for Constrained Optimization

In this appendix, we derive the condition for optimization of an objective function under the end-effector motion constraint. This result is obtained in [14] and is repeated here for completeness.

Let $L(\theta)$ denote the scalar kinematic objective function to be optimized by the utilization of redundancy. The redundant manipulator control problem is to find the joint trajectory $\theta$ that optimizes $L(\theta)$ subject to the end-effector constraint $Y = f(\theta)$. The solution to this constrained optimization problem can be obtained using Lagrange multipliers. Let the augmented scalar objective function $L^*(\theta, p)$ be defined as $$L^*(\theta,p) = L(\theta) + p^T[Y - f(\theta)] \tag{86}$$

where $p$ is the $m \times 1$ vector of Lagrange multipliers. The necessary conditions for optimality can be written as $$\frac{\partial L^*}{\partial \theta} = 0 \rightarrow \frac{\partial L}{\partial \theta} = \left(\frac{\partial f}{\partial \theta}\right)^T p = J_e^T p \tag{87}$$

$$\frac{\partial L^*}{\partial p} = 0 \rightarrow Y = f(\theta) \tag{88}$$

Now, let $N_e$ be a full-rank $r \times n$ matrix whose rows span the r-dimensional null-space of the end-effector Jacobian matrix $J_e$, that is, $N_e J_e^T = 0$. Then, premultiplying (87) by $N_e$ yields the optimality condition as $$N_e \frac{\partial L}{\partial \theta} = 0 \tag{89}$$

Equation (89) implies that the projection of the gradient of the objective function $L(\theta)$ onto the null-space of the end-effector Jacobian $J_e$ must be zero for optimality. Note that the initial configuration of the robot must be optimal, i.e., $L(\theta 0)$ should be a local maximum or minimum. The matrix $N_e$ can be constructed in several ways. It can easily be verified that one formulation for $N_e$ is $$N_e = [I_r - J_{e1}^T (J_{e2}^T)^{-1}] \tag{90}$$

where $J_{e1}$ and $J_{e2}$ are $m \times r$ and $m \times m$ partitions of $J_e$ defined by $J_3 = [J_{e1} : J_{e2}]$, and $I_r$ is the $r \times r$ identity matrix. Since $J_e$ has rank m, the m linearly independent columns of $J_e$ can always be grouped together to form the $m \times m$ nonsingular matrix $J_{e2}$ and the same reordering must be done on $\partial L/\partial \theta$. Note that $N_e$ is independent of the objective function $L$ to be optimized. Strictly speaking, equation (89) is only a necessary condition for optimality. However, by choosing $L(\theta)$ to be a convex function, as is usually possible in robotics applications, condition (89) becomes both necessary and sufficient. Equation (89) was first derived by Baillieul [20] using a different approach and used for redundancy resolution in the extended Jacobian method. By treating $$\Phi(\theta) = N_e \frac{\partial L}{\partial \theta}$$

as the kinematic function and setting $\Phi_d(t)=0$, the optimization problem is formulated as an additional task within the configuration control framework. Therefore, the extended Jacobian method of Baillieul is obtained as a special case of the configuration control scheme.

5.2 Relationship between eigenvalues of $H_m$ and $H_v$

In this appendix, we find the relationship between the eigenvalues of the $m \times m$ matrix $H_m(\theta) = J_e(\theta)J_e^T(\theta)$ and the $n \times n$ matrix $H_v(\theta) = J_e^T(\theta)J_e(\theta)$.

Let us express the $m \times n$ end-effector Jacobian matrix $J_e$ in the singular-value decomposition (SVD) form $$J_e = U \Sigma V^T \tag{91}$$

where U and V are $m \times m$ and $n \times n$ orthogonal matrices, i.e., $U^{-1} = U^T$ and $V^{-1} = V^T$, while $\Sigma$ is an $m \times n$ matrix, $m < n$, with the special diagonal form $$\Sigma = \begin{bmatrix} \sigma_1 & & & O & & \\ & \sigma_2 & & & O & \\ & & \ddots & & & \\ O & & & \sigma_m & & \end{bmatrix}$$

in which $\sigma_1, \ldots, \sigma_m$ are the m singular values of $J_e$. Then, we obtain $$H_m = J_e J_e^T = (U\Sigma V^T)(V\Sigma^T U^T) = U(\Sigma\Sigma^T)U^T$$

$$= U \begin{bmatrix} \sigma_1^2 & & O \\ & \ddots & \\ O & & \sigma_m^2 \end{bmatrix} U^T$$

$$H_v = J_e^T J_e = (V\Sigma^T U^T)(U\Sigma V^T) = V(\Sigma^T \Sigma)V^T$$

(93)

$$= V \begin{bmatrix} \sigma_1^2 & & & & \\ & \ddots & & O & \\ & & \sigma_m^2 & & \\ & O & & 0 & \\ & & & & \ddots \\ & & & & & 0 \end{bmatrix} V^T$$

We conclude that the m eigenvalues of $H_m$, namely $[\sigma_1^2, \ldots, \sigma_m^2]$, are the squares of the singular values of $J_e$. Furthermore, the n eigenvalues of $H_v$ consist of the m eigenvalues of $H_m$ and $(n-m)$ zeros; that is, $[\sigma_1^2, \ldots, \sigma_m^2, 0, \ldots]$.

5.3 Coriolis/centrifugal torque

In this appendix, expressions are given for the Coriolis/centrifugal torque in the Example of Section 3.

In the dynamic model (60) of the three-link robot, the elements of the Coriolis and centrifugal torque vector N $(\theta, \dot{\theta})$ are as follows:

$N_1 = -30\dot{\theta}_1(\dot{\theta}_2 - \dot{\theta}_1)\sin(\theta_2 - \theta_1) - 10\dot{\theta}_1(\dot{\theta}_3 - \dot{\theta}_2)\sin(\theta_3 - \theta_2) -$
$10\dot{\theta}_1(\dot{\theta}_3 - \dot{\theta}_1)\sin(\theta_3 - \theta_1) - 15(\dot{\theta}_2 - \dot{\theta}_1)^2\sin(\theta_2 - \theta_1) -$
$10(\dot{\theta}_2 - \dot{\theta}_1)(\dot{\theta}_3 - \dot{\theta}_2)\sin(\theta_3 - \theta_2) -$
$5(\dot{\theta}_2 - \dot{\theta}_1)(\dot{\theta}_3 - \dot{\theta}_1)\sin(\theta_3 - \theta_1) -$
$5(\dot{\theta}_3 - \dot{\theta}_2)\sin(\theta_3 - \theta_2) - 5(\dot{\theta}_3 - \dot{\theta}_2)(\dot{\theta}_3 - \dot{\theta}_1)\sin(\theta_3 - \theta_1)$ $N_2 = -10\dot{\theta}_1(\dot{\theta}_3 - \dot{\theta}_2)\sin(\theta_3 - \theta_2) -$
$10(\dot{\theta}_2 - \dot{\theta}_1)(\dot{\theta}_3 - \dot{\theta}_2)\sin(\theta_3 - \theta_2) -$
$5(\dot{\theta}_3 - \dot{\theta}_2)^2\sin(\theta_3 - \theta_2) + 15\dot{\theta}_1^2\sin(\theta_2 - \theta_1) + 5\dot{\theta}_1^2\sin(\theta_3 - \theta_1)$ $N_3 = 5\dot{\theta}_1^2\sin(\theta_3 - \theta_2) + 5\dot{\theta}_1^2\sin(\theta_3 - \theta_1) +$
$10\dot{\theta}_1(\dot{\theta}_2 - \dot{\theta}_1)\sin(\theta_3 - \theta_2) +$
$5(\dot{\theta}_2 - \dot{\theta}_1)\sin(\theta_3 - \theta_2)$

5.4 Configuration Controller

In this appendix, we describe the configuration controller used in the Example of Section 3.

Following [9], the configuration controller for the robot in Section 3 is given by $$T = J^T[d(t) + K_p(t)E + K_v(t)\dot{E} + C(t)\dot{X}_d + B(t)\ddot{X}_d + A(t)X_d] \tag{94}$$

where J is the $3 \times 3$ augmented Jacobian matrix, $E = X_d - X$ is the $3 \times 1$ configuration tracking-error vector, and the controller terms $\{d, K_p, K_v, C, B, A\}$ are generated on-line according to the following adaptation laws:

$$q = 5000 E + 500 \dot{E}; \quad d(t) = 0.5 \int_0^t q(t) dt \tag{95}$$

$$K_p(t) = 2 \int_0^t q(t) E_T(t) dt; \quad v(t) = 2 \int_0^t q(t) \dot{E}^T(t) dt$$

-continued $$C(t) = 0.5 \int_0^t q(t) X_d^T(t) dt$$

$$B(t) = 0.5 \int_0^t q(t) \dot{X}_d^T(t) dt$$

$$A(t) = 0.5 \int_0^t q(t) \ddot{X}_d^T(t) dt$$

where the initial values of all the controller terms are chosen as zero. Note that the *same* control law (94) and adaptation laws (95) are used in all four Cases 3.1–3.4. For each case, the corresponding augmented Jacobian $$J = \begin{pmatrix} J_e \\ \ldots \\ J_c \end{pmatrix}$$

is used in the control law (94), where $J_e$ is given in (58) and $J_c$ in each case is as follows:

Case 3.1

$$J_c = [2 \sin(\theta_3 - \theta_2) \cos 2\theta_1, -\cos(\theta_3 - \theta_2) \sin 2\theta_1, \cos(\theta_3 - \theta_2) \sin 2$$

Case 3.2

$$J_c = [-\cos(\theta_2 - \theta_1) \sin 2\theta_3, \cos(\theta_2 - \theta_1) \sin 2\theta_3, 2 \sin(\theta_2 - \theta_1) \cos 2$$

Case 3.3

$$J_c = [30 \sin(\theta_2 - \theta_1) + 10 \sin(\theta_3 - \theta_1), -30 \sin(\theta_2 - \theta_1) + 10 \sin(\theta_3 - 10 \sin(\theta_3 - \theta_2) - 10 \sin(\theta_3 - \theta)$$

Case 3.4

$$J_c = [-10 \sin 2\theta_1, -10 \sin 2\theta_2, -10 \sin 2\theta_3]$$

What is claimed is:

1. A method of controlling a redundant robot having n joints operating in m-dimensional task space with redundancy r=n-m, and having an end effector, said method comprising:
   first defining a basic task motion of said robot within a set of end-effector coordinates, corresponding to m constraints on movement of said n joints;
   second defining not more than r constraints on said basic task motion corresponding to a minimization of gravity loading on said joints, wherein said second defining comprises,
      defining an n-by-r matrix operator, $N_e$, spanning a null space of a Jacobian operator of said end-effector,
      defining an n-by-1 vector which is a partial derivative of a gravity loading function with respect to angles of said joints, and
      setting the product of said matrix operator and said vector to zero as a minimization condition; and,
   controlling said joints so as to simultaneously fulfill the m constraints of said basic task motion and the r constraints of said minimization of gravity loading.

2. The method of claim 1 wherein said gravity loading function is a function of the angles of all of said n joints and comprises a sum over all of said n joints of squares of elements of a vector of gravity loading on respective joints.

3. The method of claim 2 wherein said gravity loading function is defined in terms of n individual weighting factors associated with respective ones of said n joints, said weighting factors determining the joints for which gravity loading is minimized.

4. A method of controlling a redundant robot having n joints operating in m-dimensional task space with redundancy r=n-m, and having an end effector, said method comprising:
   first defining a basic task motion of said robot within a set of end-effector coordinates, corresponding to m constraints on movement of said n joints;
   second defining not more than r constraints on said basic task motion corresponding to a minimization of joint inertia on said joints, wherein said second defining comprises,
      defining an n-by-r matrix operator, $N_e$, spanning a null space of a Jacobian operator of said end-effector,
      defining an n-by-1 vector which is a partial derivative of a joint inertia function with respect to angles of said joints, and
      setting the product of said matrix operator and said vector to zero as a minimization condition; and
   controlling said joints so as to simultaneously fulfill the m constraints of said basic task motion and the r constraints of said minimization of joint inertia.

5. The method of claim 4 wherein said joint inertia function is a function of the angles of all of said n joints and comprises a sum over all of said n joints of off-diagonal joint-coupling elements of a joint inertia matrix for each one of said joints.

6. A method of controlling a redundant robot having n joints operating in m-dimensional task space with redundancy r=n-m, and having an end effector, said method comprising:
   first defining a basic task motion of said robot within a set of end-effector coordinates, corresponding to m constraints on movement of said n joints;
   second defining not more than r constraints on said basic task motion corresponding to an optimization of joint mechanical advantage of said joints, wherein said second defining comprises,
      defining an n-by-r matrix opertor, $N_e$, spanning a null space of a Jacobian operator of said end-effector,
      defining an n-by-1 vector which is a partial derivative of a joint mechanical advantage function with respect to angles of said joints, and
      setting the product of said matrix operator and said vector to zero as a minimization condition whereby to minimize joint mechanical advantage; and
   controlling said joints so as to simultaneously fulfill the m constraints of said basic task motion and the r constraints of said optimization of joint mechanical advantage.

7. The method of claim 6 wherein said joint mechanical advantage function is a function of the angles of said joints and comprises a projection of an end effector Jacobian matrix of a respective joint and a unit vector of a direction of applied force of an end effector for each joint.

8. A method of controlling a redundant robot having n joints operating in m-dimensional task space with redundancy $r=n-m$, and having an end effector, said method comprising:

first defining a basic task motion of said robot within a set of end-effector coordinates, corresponding to m constraints on movement of said n joints;

second defining not more than r constraints on said basic task motion corresponding to an optimization of an end effector-to-joint angle velocity ratio, wherein said second defining comprises, defining an n-by-r matrix operator, $N_e$, spanning a null space of a Jacobian operator of said end-effector, defining an n-by-1 vector which is a partial derivative of an end effector-to-joint angle velocity ratio function with respect to angles of said joints, and setting the product of said matrix operator and said vector to zero as a minimization condition; and, controlling said joints so as to simultaneously fulfill the m constraints of said basic task motion and the r constraints of said optimization of an end effector-to-joint angle velocity ratio.

9. The method of claim 8 wherein said end effector-to-joint angle velocity ratio function comprises projections of end effector Jacobian matrices of respective joints and an angular velocity vector of respective joints.

10. A method of controlling a redundant robot having n joints operating in m-dimensional task space with redundancy $r=n-m$, and having an end effector, said method comprising:

first defining a basic task motion of said robot within a set of end-effector coordinates, corresponding to m constraints on movement of said n joints;

second defining not more than r constraints on said basic task motion corresponding to optimization of end effector movement sensitivity, wherein said second defining comprises, defining an n-by-r matrix operator, $N_e$, spanning a null space of a Jacobian operator of said end-effector, defining an n-by-1 vector which is a partial derivative of an end effector movement sensitivity function with respect to angles of said joints, and setting the product of said matrix operator and said vector to zero as a minimization condition; and, controlling said joints so as to simultaneously fulfill the m constraints of said basic task motion and the r constraints of said optimization of end effector movement sensitivity.

11. The method of claim 10 wherein said end effector movement sensitivity function comprises a trace of a product of an end effector Jacobian matrix with its transpose.

12. A method of controlling a redundant robot having n joints operating in m-dimensional task space with redundancy $r=n-m$, and having an end effector, said method comprising:

first defining a basic task motion of said robot within a set of end-effector coordinates, corresponding to m constraints on movement of said n joints;

second defining not more than r constraints on said basic task motion corresponding to optimization of end effector compliance, wherein said second defining comprises, defining an n-by-r matrix operator, $N_e$, spanning a null space of a Jacobian operator of said end-effector, defining an n-by-1 vector which is a partial derivative of an end effector movement compliance function with respect to angles of said joints, and setting the product of said matrix operator and said vector to zero as a minimization condition; and, controlling said joints so as to simultaneously fulfill the m constraints of said basic task motion and the r constraints of said optimization of end effector compliance.

13. The method of claim 12 wherein said end effector compliance function comprises a sum of squares of matrix elements of a projection of an end effector Jacobian matrix on a joint stiffness matrix.

14. A method of controlling a redundant robot having n joints operating in m-dimensional task space with redundancy $r=n-m$, and having an end effector, said method comprising:

first defining a basic task motion of said robot within a set of end-effector coordinates, corresponding to m constraints on movement of said n joints;

second defining not more than r constraints on said basic task motion corresponding to optimization of end effector impact force, wherein said second defining comprises, defining an n-by-r matrix operator, $N_e$, spanning a null space of a Jacobian operator of said end-effector, defining an n-by-1 vector which is a partial derivative of an end effector impact force function with respect to angles of said joints, and setting the product of said matrix operator and said vector to zero as a minimization condition; and, controlling said joints so as to simultaneously fulfill the m constraints of said basic task motion and the r constraints of said optimization of end effector impact force.

15. The method of claim 14 wherein said end effector impact force function comprises a projection of an end effector mass matrix on a unit vector of an impact force of an end effector.

* * * * *